US008214526B2

(12) United States Patent
Wu et al.

(10) Patent No.: US 8,214,526 B2
(45) Date of Patent: *Jul. 3, 2012

(54) CONTEXT-BASED ROUTING IN MULTI-HOP NETWORKS

(75) Inventors: Yunnan Wu, Redmond, WA (US); Saumitra M. Das, West Lafayette, IN (US); Ranveer Chandra, Kirkland, WA (US); Dinei Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/696,973

(22) Filed: Jan. 29, 2010

(65) Prior Publication Data

US 2010/0128628 A1    May 27, 2010

Related U.S. Application Data

(63) Continuation of application No. 11/745,340, filed on May 7, 2007, now Pat. No. 7,693,939.

(51) Int. Cl.
*G06F 15/173* (2006.01)
(52) U.S. Cl. ......... 709/238; 709/220; 370/218; 455/450
(58) Field of Classification Search .................. 709/238, 709/220; 370/218; 455/450
See application file for complete search history.

(56) References Cited

U.S. PATENT DOCUMENTS

| 5,987,011 | A | 11/1999 | Toh |
| 6,028,857 | A | 2/2000 | Poor |
| 6,603,972 | B1 | 8/2003 | Sawyer |
| 6,842,463 | B1 | 1/2005 | Drwiega et al. |
| 6,934,249 | B1 * | 8/2005 | Bertin et al. ................. 370/218 |
| 7,092,391 | B2 | 8/2006 | Umeda |
| 7,365,519 | B2 * | 4/2008 | Gibbs et al. .................... 322/28 |
| 7,366,519 | B2 * | 4/2008 | Jason et al. .................. 455/450 |

(Continued)

FOREIGN PATENT DOCUMENTS

WO    WO2005064864    * 7/2005    ................ 709/238

(Continued)

OTHER PUBLICATIONS

Broch, et al., "A Performance Comparison of Multi-Hop Wireless Ad Hoc Network Routing Protocols", retrieved at <<http://www.monarch.cs.rice.edu/monarch-papers/mobicom98.ps>>, Proceeding of the Fourth Annual ACM/IEEE International Conference on Mobile Computing and Networking (MobiCom'98), Oct. 25-30, 1998, ACM, 1998, pp. 1-13.

(Continued)

*Primary Examiner* — Tammy Nguyen
(74) *Attorney, Agent, or Firm* — Lee & Hayes, PLLC

(57) ABSTRACT

Context-based routing in multi-hop networks involves using a context-based routing metric. In a described implementation, respective path values are calculated for respective ones of multiple paths using the context-based routing metric. A path is selected from the multiple paths responsive to the calculated path values. Data is transmitted over at least one link of the selected path. In an example embodiment, the context-based routing metric is ascertained responsive to an estimated service interval (ESI) of a bottleneck link of each path of the multiple paths. In another example embodiment, the context-based routing metric is ascertained responsive to an expected resource consumption (ERC) metric. In an example embodiment of path selection, the path is selected using a context-based path pruning (CPP) technique that involves maintaining multiple local contexts at each intermediate node, with each local context representing at least one partial path.

17 Claims, 13 Drawing Sheets

U.S. PATENT DOCUMENTS

| | | |
|---|---|---|
| 2004/0156345 A1 | 8/2004 | Steer et al. |
| 2004/0236815 A1 | 11/2004 | Mirsky et al. |
| 2005/0208949 A1 | 9/2005 | Chiueh |
| 2005/0286426 A1 | 12/2005 | Padhye et al. |
| 2006/0002303 A1 | 1/2006 | Bejerano et al. |
| 2006/0240835 A1 | 10/2006 | Jain et al. |
| 2006/0250999 A1 | 11/2006 | Zeng et al. |

FOREIGN PATENT DOCUMENTS

| | | |
|---|---|---|
| WO | WO2005064864 A1 | 7/2005 |
| WO | WO2006098723 A1 | 9/2006 |

OTHER PUBLICATIONS

Couto, "High-Throughput Routing for Multi-Hop Wireless Networks", retrieved at <<http://citeseer.ist.psu.edu/cache/papers/cs/31304/http:zSzzSzwww.pdos.lcs.mit.eduzSzpaperszSzgrid-:decouto-phdzSzthesis.pdf/decouto04highthroughput.pdf>>, Massachusetts Institute of Technology, Jun. 2004, pp. 1-119.

Draves, et al., "Routing in Multi-Radio, Multi-Hop Wireless Mesh Networks", MobiCom '04, Sep. 26-Oct. 1, 2004, 15 pages.

Hsiao, et al., "Qos Routing in a Multi-Hop Wireless Access Network", available at least as early as <<Nov. 17, 2006>>, retrieved at <<http://www.eecs.harvard.edu/networking/papers/hhkv-qos-current.pdf>>, Harvard University, pp. 1-21.

Yang, et al., "Designing Routing Metrics for Mesh Networks", In Proc. IEEE Workshop on Wireless Mesh Networks (WiMesh), Santa Clara, CA, Sep. 2005. IEEE, 9 pages.

Yang, et al., "Interference-aware Load Balancing for Multihop Wireless Networks", Technical Report UIUCDCS-R-2005-2526, Department of Computer Science, University of Illinois at Urbana-Champaign, 2005, 16 pages.

* cited by examiner

CONTEXT-BASED ROUTING IN MULTI-HOP NETWORKS

RELATED APPLICATIONS

This U.S. Non-provisional Application for Letters Patent is a continuation of and claims the benefit of priority to U.S. patent application Ser. No. 11/745,340, filed on May 7, 2007, the disclosure of which is incorporated by reference herein.

BACKGROUND

Some networks, including some wireless networks, are pre-planned and centrally-controlled. A single provider can organize the network nodes and installs the infrastructure. Operationally, a centralized entity has a wealth of knowledge about various network characteristics. Consequently, a routing between two communication participants at different network nodes may be pre-planned and centrally-controlled.

On the other hand, ad hoc networks, including wireless ad hoc networks, do not usually involve significant pre-planning or centralized control. One or perhaps a few network nodes are often established by different individuals. These individuals activate their respective network nodes, which are designed to automatically interoperate with other network nodes that are established by other individuals. Even without pre-planning or centralized control, operation of these ad hoc networks still entails routing connections for communication participants between two network nodes. Mechanisms and techniques for effectively determining efficient routings can involve considering and sharing parameters across many network nodes as well as appropriately balancing a multitude of factors.

SUMMARY

Context-based routing in multi-hop networks involves using a context-based routing metric. In a described implementation, respective path values are calculated for respective ones of multiple paths using the context-based routing metric. A path is selected from the multiple paths responsive to the calculated path values. Data is transmitted over at least one link of the selected path. In an example embodiment, the context-based routing metric is ascertained responsive to an estimated service interval (ESI) of a bottleneck link of each path of the multiple paths. In another example embodiment, the context-based routing metric is ascertained responsive to an expected resource consumption (ERC) metric. In an example embodiment of path selection, the path is selected using a context-based path pruning (CPP) technique that involves maintaining multiple local contexts at each intermediate node, with each local context representing at least one partial path.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
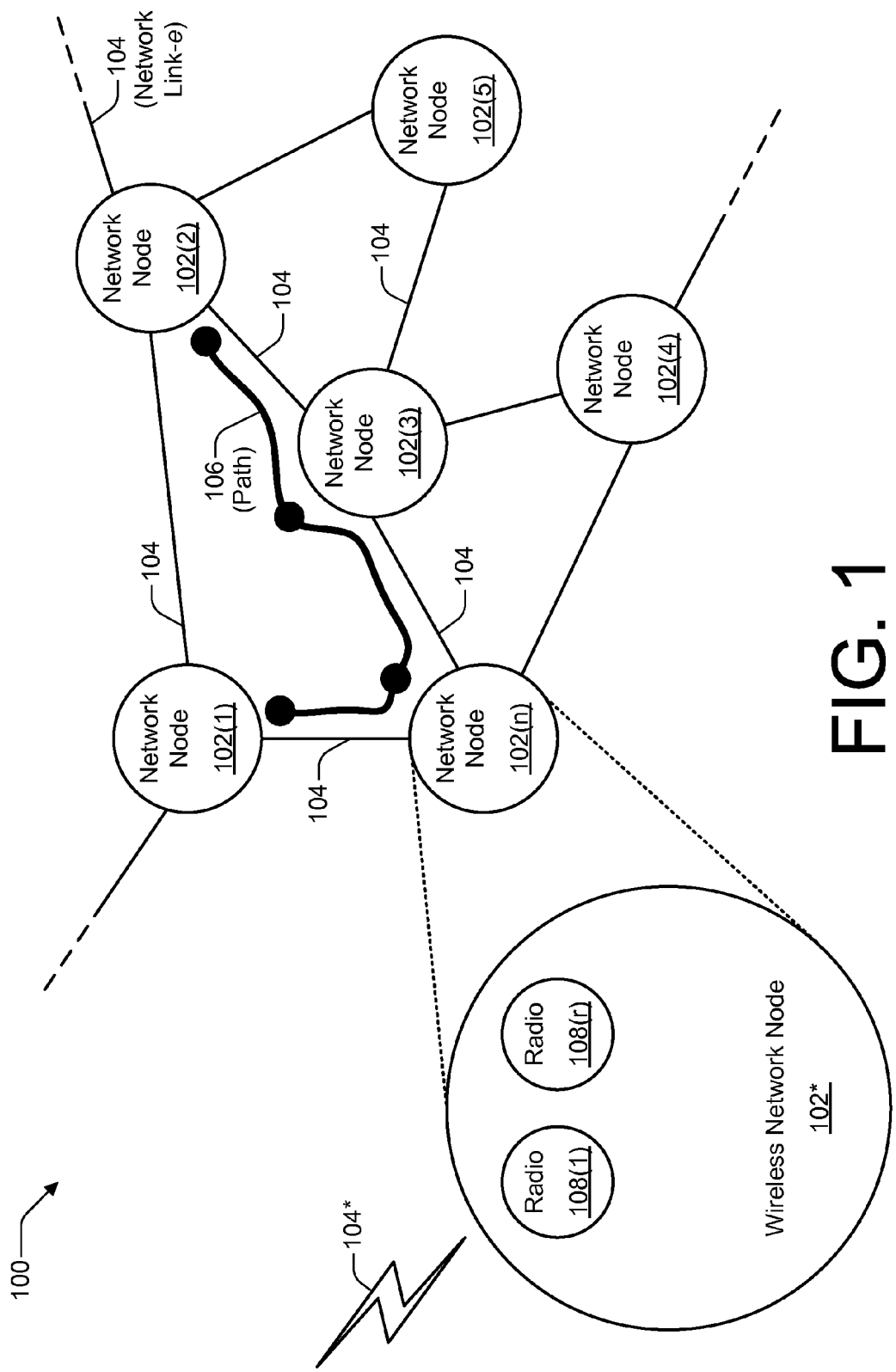
FIG. 1 is a block diagram illustrating an example of a network environment having multiple network nodes.

Introduction to Context-Based Routing in Multi-Hop Networks

A fundamental problem in multi-hop wireless networks is routing, e.g., moving packets from a source node to a destination node. Routing protocols have traditionally been based on finding shortest (cheapest) paths under certain cost metrics. A conventional routing metric models the cost of a path as the sum of the costs on the constituting links, where the cost of a link typically reflects the link quality in one way or another (e.g., loss rate, supported bit-rate, delay, etc.). The routing system then aims at finding the path offering the lowest total cost.

However, such common practice is not adequate for all scenarios, especially as new wireless technologies appear in the lower layers of the networking stack. For example, a promising technique for improving the capacity of mesh networks is to use multiple radios. With multiple radios, a device can transmit and receive at the same time, including on different radio interfaces. The radio spectrum can therefore potentially be utilized more efficiently because more concurrent communications can be packed in spectrum, space, and time when using multiple radios. Hence, multiple radios open up new opportunities for high throughput wireless communications. A key challenge towards unleashing the potential of multiple radios in wireless mesh networks is interference-aware routing. Example implementations for a self-interference aware routing protocol for multi-radio wireless mesh networks are described herein.

To model the self-interference of the links on a path, a Self-Interference aware routing Metric (SIM) is described. It is a context-based metric in that the cost of a link depends on what other (e.g., previous) links are used in the route. The cross-coupling of the links in a context-based metric renders it challenging to find the minimum cost route. In particular, a direct application of Dijkstra's shortest path algorithm fails to incorporate the impact of past decisions on the future parts of the route. Hence, a context-based path pruning (CPP) method is also described. The CPP method prunes suboptimal partial-paths based on fixed-length contexts as it explores the path space.

Thus, implementations of the described interference-aware approach involve two synergistic building blocks: (1) a context-based path metric (the SIM) that properly models the link interdependencies, and (2) an efficient algorithm (the CPP method) for route optimization under the context-based path metric. Together, they constitute an instance of a general context-based routing paradigm, which is applicable to scenarios where modeling the interactions between different links is relevant to performance. Other applications of this paradigm for wired and wireless networks are also described herein below.

Another example is local mixing, a recent link layer advance that exploits the broadcast nature of the wireless medium. The local mixing engine may reside between the routing and media access control (MAC) layers. It maintains information about the packets each neighbor has and identifies opportunities to mix the outgoing packets via network coding to reduce the, e.g., number of transmissions in the air. Local mixing, on its own, can improve the link layer efficiency. The gain of this technique, however, depends on the traffic pattern in the network, and hence the routing decisions. An implementation that is described herein involves a routing method based on a Markovian metric that can find routes that are likely to have more mixing opportunities.

This Markovian metric models the cost of a path as the cost of the first hop, plus the cost of the second hop conditioned on the first hop, and so on. A Markovian metric is used to model the reduction of channel resource consumption due to local mixing. This leads to routing decisions that can better take advantage of local mixing opportunities. Throughput gains and resource savings can be achieved by applying the Markovian metric to facilitate local mixing.

The description that follows is divided into two major sections: "Example Implementations for Context-Based Routing in Multi-Radio Mesh Networks" and "Example Implementations for Routing with a Markovian Metric to Promote Local Mixing". Certain realizations of the latter may be considered as specific implementations of the former, including optionally with wireless nodes having only one radio. The principles described herein may also be applied to other networks having multiple links originating and terminating at different nodes.

Generally, context-based routing in multi-hop networks may be implemented in many different network types and topologies. However, an example network is illustrated in FIG. 1 and described below.

FIG. 1 is a block diagram illustrating an example of a network environment 100. Network 100 includes multiple network nodes 102. As illustrated, network 100 includes "n" wireless nodes 102(1), 102(2), 102(3), 102(4), 102(5) . . . 102(n), with "n" being a positive integer. Each network node 102 may be realized by, for example, an electronic device. An example device is described herein below with particular reference to FIG. 16.

Each network node 102 may be in communication with one or more other network nodes 102 via at least one network communications link 104, some of which are explicitly denoted in FIG. 1. Each link 104 may be a wired link or a wireless link. A path 106 is shown between network node 102(1) and network node 102(2); path 106 extends through network nodes 102(n) and 102(3). Although the illustrated path 106 includes three links 104, a path may be more generally comprised of any two or more links 104.

To enable wireless communication, one or more network nodes 102 may be realized as a wireless network node 102*. Each wireless node 102* includes at least one radio 108. Two radios 108(1) and 108(r) are specifically shown. However, each wireless node 102* may have "r" radios 108, in which "r" represents some positive integer 1, 2, 3, 4, . . . r.

Each radio 108 enables a wireless network node 102* to communicate on a wireless channel. Each radio is typically capable of communicating via one or more wireless links 104* in accordance with at least one wireless standard. Example wireless standards include, but are not limited to, IEEE 802.11 standards, IEEE 802.16 standards, IEEE 802.22 standards, UWB, and so forth. By way of example only, multiple such wireless network nodes 102* may form a wireless ad hoc mesh network.

Example Implementations for Context-Based Routing in Multi-Radio Mesh Networks

1. Introduction: Context-Based Routing in Multi-Radio Mesh Networks

As introduced above, a promising technology for improving the capacity of wireless mesh networks is to use multiple radios at each node. With multiple radios, a device can transmit and receive at the same time, including on different radio interfaces. The radio spectrum can also be utilized more efficiently because more concurrent communications can be packed in spectrum, space, and time. However, maximizing the benefit of multiple radios calls for intelligent routing decisions that are aware of multiple radios and can take advantage of them. In particular, routes that contain low interference among the constituting links are chosen.

Generally, example implementations for Context-based Routing Protocol (CRP) for interference-aware routing in multi-radio networks are described herein. CRP addresses some open issues and challenges on this problem. In a described implementation, CRP has two principle components: (1) a new path metric (the SIM), and (2) a novel context-based path selection technique (the CPP method).

One aspect of the first component, the SIM metric, is that it is context-dependent. In other words, it assesses the cost of each link in the context of previous hops for the path under consideration. As described further herein below, the SIM metric is a weighted sum of the estimated transmission time (ETT) and the maximum expected service interval (ESI) at the bottleneck link. Similar to how the long term throughput of a pipelining system is determined by the bottleneck component, the long term throughput of a wireless route is determined by the bottleneck link. Herein below, we show that the maximum ESI term can be interpreted as an "ideally achievable" throughput assuming perfect scheduling.

Because the SIM metric is context-dependent, a direct application of the Dijkstra's shortest path algorithm may lead to rather suboptimal paths. The reason is that Dijkstra's algorithm operates on an optimality principle: The shortest path from s to t via v is the shortest path from s to v concatenated with the shortest path from v to t. Such an optimality principle no longer holds for a context-based metric. In response to this situation, the second component of CRP is a general context-based path pruning method (CPP) for discovering good paths using a context-based metric. To model the context of a partial path while avoiding the exponential growth in the number of partial paths, CPP maintains a set of paths that reach each node v, corresponding to different local contexts. Each local context can be viewed as a concise summary of the dominating history of all the partial paths that end with that local context, based on the observation that older history usually has less impact on the future. The current best path under each local context is maintained and considered further for possible expansion into an s-t path.

In short, implementing the interference-aware routing approach of CRP involves (i) properly modeling the link interdependencies (e.g., via the SIM metric) and (ii) handling the ensuing algorithmic challenges in route optimization (e.g., via the CPP method). The use of local contexts in pruning is synergistic with the use of contexts in cost modeling. Together they present a general context-based routing paradigm, which is applicable in scenarios where modeling link-interdependencies is relevant.

Figure 2:
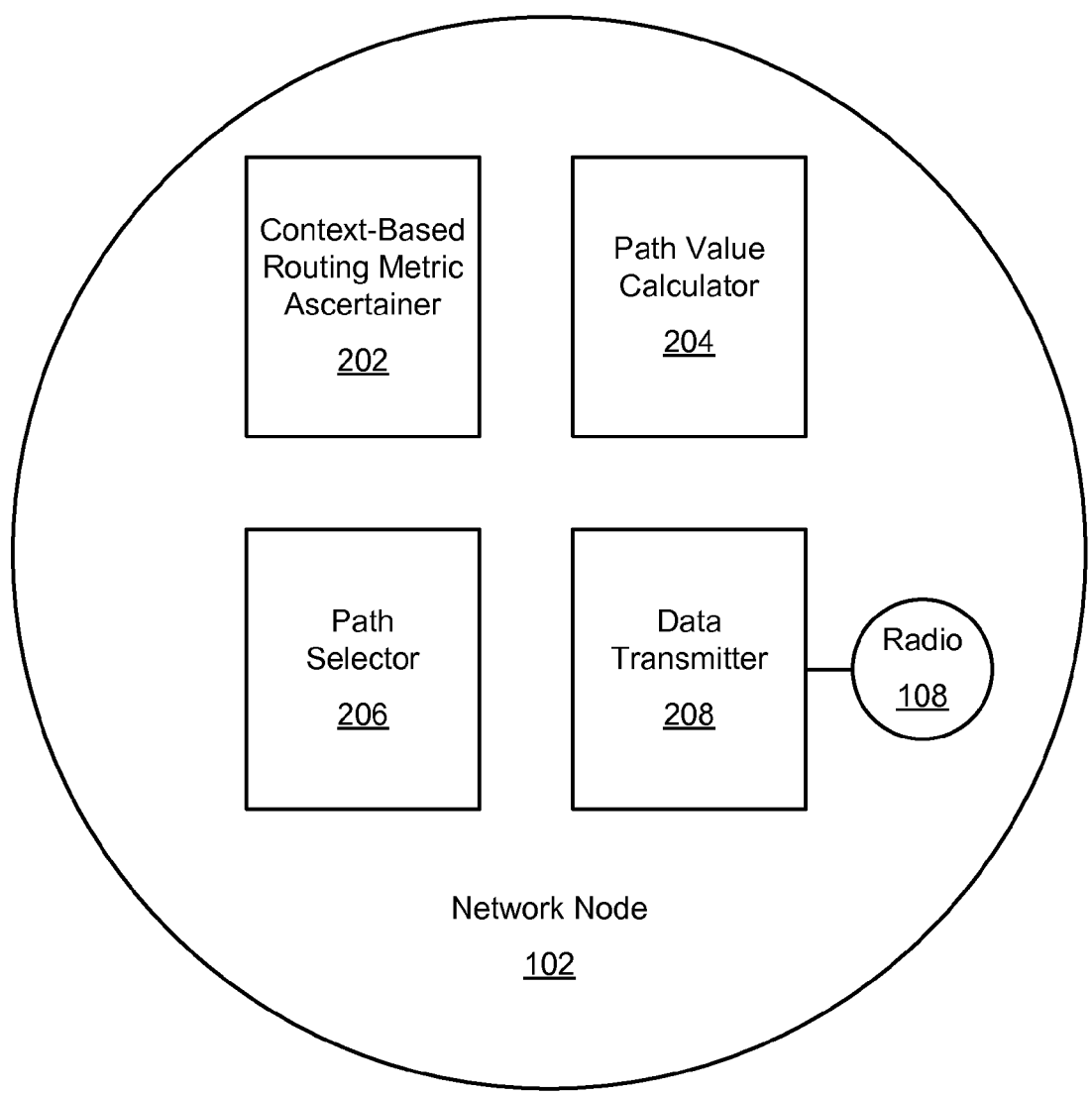
FIG. 2 is a block diagram of an example network node from a functional perspective that may implement context-based routing in multi-hop networks.

FIG. 2 is a block diagram of an example network node 102 from a functional perspective that may implement context-based routing in multi-hop networks. As illustrated, network node 102 includes four components: a context-based routing metric ascertainer 202, a path value calculator 204, a path selector 206, and a data transmitter 208. These four components may be realized as hardware, software, firmware, fixed logic circuitry, some combination thereof, and so forth. The functionality of these components is described in brief immediately below and in significantly greater detail further below.

Context-based routing metric ascertainer 202 ascertains a context-based routing metric, such as a SIM metric, a Markovian metric (e.g., ERC), and so forth. Path value calculator 204 calculates a value for a given path under a selected context-based routing metric. Context-based routing metric ascertainer 202 and path value calculator 204, for example, may cooperatively interact in the performance of their functions. The calculated values for different paths may be compared in order to select a preferred path.

Path selector 206 selects a preferred path responsive to the calculated values for multiple potential paths. Path selector 206 may implement, for example, a context-based path pruning (CPP) technique as described herein. Path value calculator 204 and path selector 206, for example, may cooperatively interact in the performance of their functions. Once a path has been selected, or at least a first link of a selected path has been determined, data for a communication may be transmitted by data transmitter 208 using a radio 108.

Figure 3:
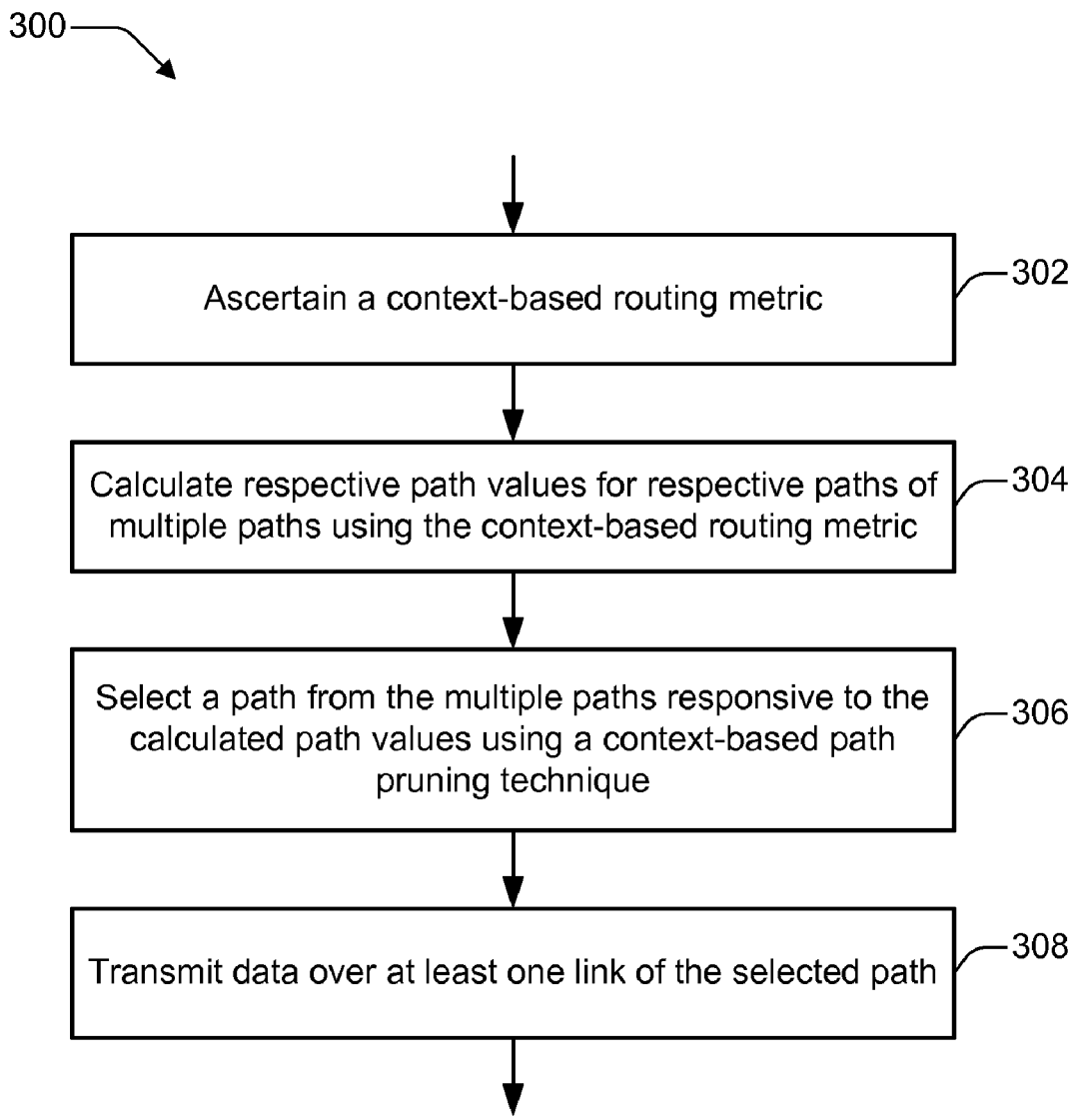
FIG. 3 is a flow diagram that illustrates an example of a general method for context-based routing in multi-hop networks.

FIG. 3 is a flow diagram 300 that illustrates an example of a general method for context-based routing in multi-hop networks. Flow diagram 300 includes four (4) blocks 302-308.

Although the actions of flow diagram 300 may be performed in other environments and with a variety of hardware, firmware, software, etc. combinations, a network node 102 (of FIGS. 1 and 2) may be used, by way of example only, to implement the method of flow diagram 300.

In a described implementation, starting at block 302, a context-based routing metric is ascertained. At block 304, respective path values for respective paths of multiple paths are calculated using the context-based routing metric. Example implementations for the actions of blocks 302 and 304 are described herein below in Section 2, which is entitled "Self-Interference Aware Routing Metric".

At block 306, a path from the multiple paths is selected responsive to the calculated path values using a context-based path pruning technique. Example implementations for the actions of block 306 are described herein below in Section 3, which is entitled "Context-Based Path Pruning". It should be understood that a final path value associated with and representing the cost of a given path, as well as a final path selection, may be achieved gradually under a described implementation of CPP. At block 308, data is transmitted over at least one link of the selected path toward the ultimate destination of the data.

2. Self-Interference Aware Routing Metric

For an example implementation, we describe in this section a first component of CRP: the self-interference aware metric (SIM). By way of example only, we address a multi-hop wireless network equipped with multiple radios. Without loss of generality, we assume that each radio is tuned to a fixed channel for an extended duration and that a route specifies the interfaces to be traversed.

We define the SIM metric as a weighted sum of two terms: the expected transmission time (ETT) and the expected service interval (ESI). An example equation version of the SIM metric is presented below as equation (M0), with "M" denoting a multi-radio embodiment:

$$SIM(\wp) \triangleq (1-\beta)\sum_k ETT(e_k) + \beta \max_k ESI(e_k \mid \wp_{k-1}). \quad (M0)$$

The $\beta$ variable enables the two addend terms to be weighted. Each link is represented by the $e_k$ variable. The $\wp$ variable represents the path or route. The ETT and ESI parameters are described further below in Sections 2.1 and 2.2, respectively.

Figure 4:
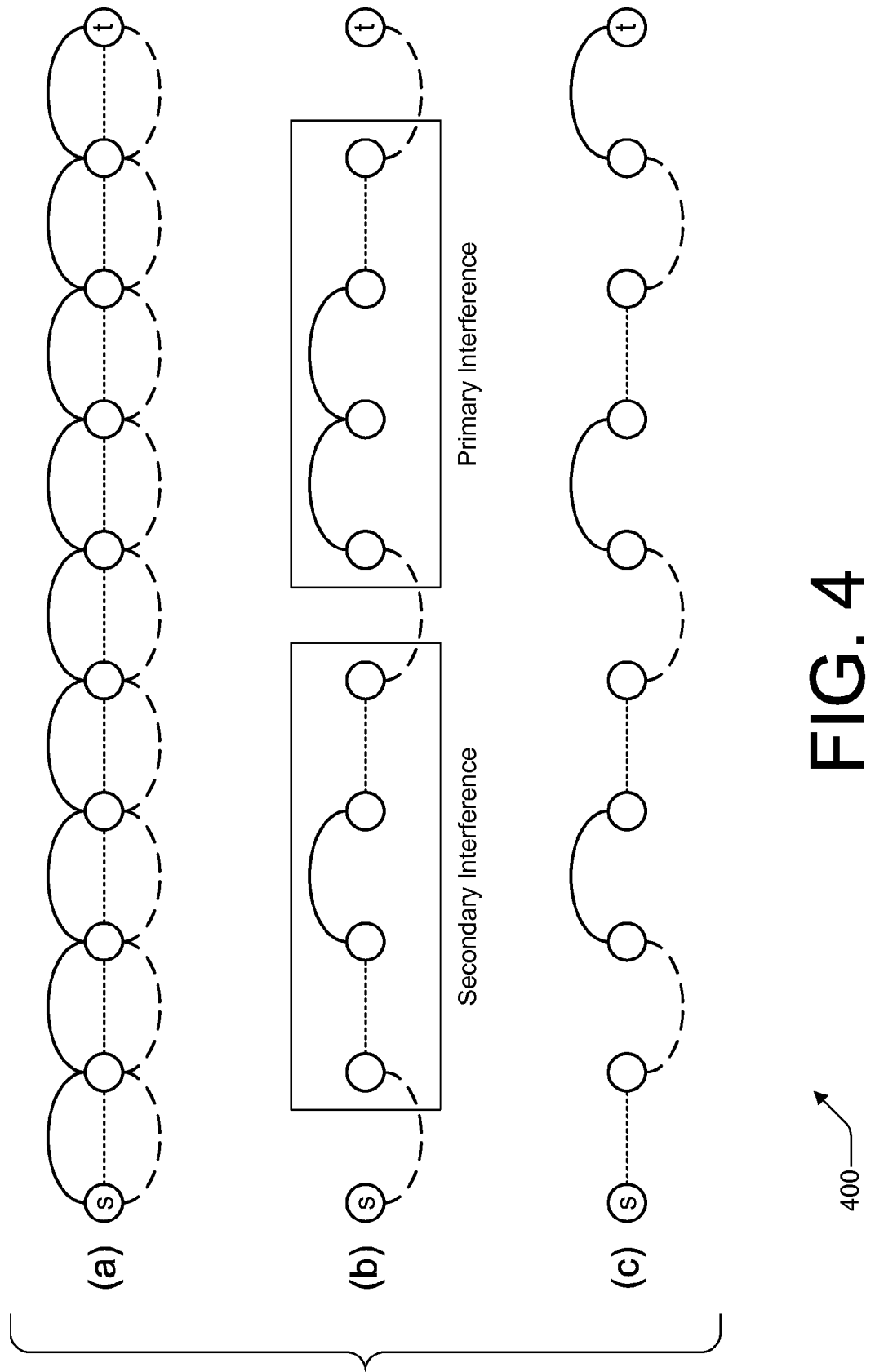
FIG. 4 is a graphical depiction of an example ten-node network topology with two potential routings.

FIG. 4 is a graphical depiction 400 of an example ten-node network topology with two potential routings. As shown in network topology (a), there are ten nodes that start with a source node s and terminate with a destination node t. Each node can communicate over one of three orthogonal channels, which are represented by a solid line, a dotted line, and a dashed line.

A sub-optimal routing is shown in network topology (b). With network topology (b), primary interference occurs when two adjacent nodes transmit on the same channel, and secondary interference occurs when two nodes that are separated by only one intervening or intermediate node transmit on the same channel. An example superior, if not optimal, routing is shown in network topology (c). Any two nodes that are communicating on the same channel for the illustrated path are thus maximally separated. Using the SIM metric, the path in (c) exhibits a lower cost than the path in (b). Hence, SIM allows us to distinguish these two paths.

2.1 Expected Transmission Time (ETT)

In a described implementation, the first term for the SIM metric is the sum of the ETT along the route. The ETT metric aims at estimating the average transmission time for sending a unit amount of data. It may be defined as indicated in equation (M1) below:

$$ETT \triangleq \frac{ETX}{\text{Link Bit Rate}}. \quad (M1)$$

For equation (M1), the ETX metric estimates the number of transmissions, including retransmissions, needed to send a unicast packet across a link. It is computed as $$ETX \triangleq 1/(1-p),$$

where p is the probability that a single packet transmission over link e is not successful. The "Link Bit-Rate" in equation (M1) can be measured by, for example, a technique of packet pairs. This method can produce sufficiently accurate estimates of link bandwidths.

2.2 ESI of the Bottleneck Link

In a described implementation, the second term is the estimated service interval (ESI) at the bottleneck link. This variable therefore reflects how fast the route can send packets in the absence of contending traffic. The "max" operation is used here instead of the sum operation. This can be explained by a pipeline analogy. In a pipeline system including several processing stages, the long term throughput is determined by that of the bottleneck stage, instead of the average throughput of the stages. Sending packets along a wireless route is similar or analogous. Thus, the long term throughput of a flow is determined by that of the bottleneck link.

The ESI of a link may be defined as shown below in equation (M2):

$$ESI(e_k \mid \wp_{k-1}) \triangleq ETT(e_k) + \sum_{j<k} p_{jk} ETT(e_j). \quad (M2)$$

In equation (M2) above, $p_{jk}$ is a binary number that reflects whether links $e_j$ and $e_k$ interfere with each other. But it should be understood that it may be generalized to allow $p_{jk}$ to be a fractional number between [0,1].

Characterizing the interference relations among the links can be challenging. One method is to make use of actual interference measurements. Consider two links, A→B and C→D, using the same channel. There are four primary forms of interference: (i) C can sense A's transmission via physical or virtual carrier sensing, and hence refrains from accessing the medium; (ii) A can sense C's transmission; (iii) transmissions of A and C collide in D; and (iv) transmissions of A and C collide in B. Based on this, we adopt without loss of generality a simplified approach for the description herein: We treat the two links as interfering if A has a link to C or D with sufficiently good quality, or C has a link to A or B with sufficiently good quality.

The ESI expression of equation (M2) leaves out the interference caused by other contending traffic. This is a simplification in modeling; hence, the interference caused by other contending traffic may alternatively be incorporated into an implementation. The ESI expression (M2) considers the self-interference from the previous hops of the route by adding up the expected transmission times of the previous links. The intuition is that the packets at the link need to share the channel with the interfering links on the route.

It is possible to also add the ETTs from the subsequent links on the path (as well as from the previous links) because both previous and subsequent links can create interference. Although this approach can alternatively be adopted, the following theorem explains why it is not adopted herein.

Theorem 1 (Interpretation of Bottleneck ESI): Assuming ideal scheduling, sufficiently long flow, absence of contending traffic, and an ideal binary interference model dictated by a conflict graph, the end-to-end throughput of $1/\max_k ESI(e_k \wp_{k-1})$ is achievable.

Proof of Theorem 1: Under the assumptions in the theorem's claim, finding the optimal end-to-end throughput essentially amounts to finding an optimal interference-free scheduling of the uses of the constituting links. If we can schedule each link to transfer B bits in T seconds, then the throughput B/T can be achieved. It is well known that this problem can be viewed as a continuous version of the graph coloring problem on the conflict graph.

In greedy coloring algorithms, nodes in a graph are visited one by one. Each node tries to reuse some existing colors if possible. If not, the node selects a new color. With this procedure, it is easy to see that the graph can be colored in $\Delta(U)+1$ colors, where $\Delta(U)$ is the maximum degree of a vertex. The greedy coloring algorithm always looks at the already colored nodes, but not future nodes. Hence, in fact the upper-bound can be tightened to one plus the maximum number of already-colored neighbors for the nodes.

Figure 5:
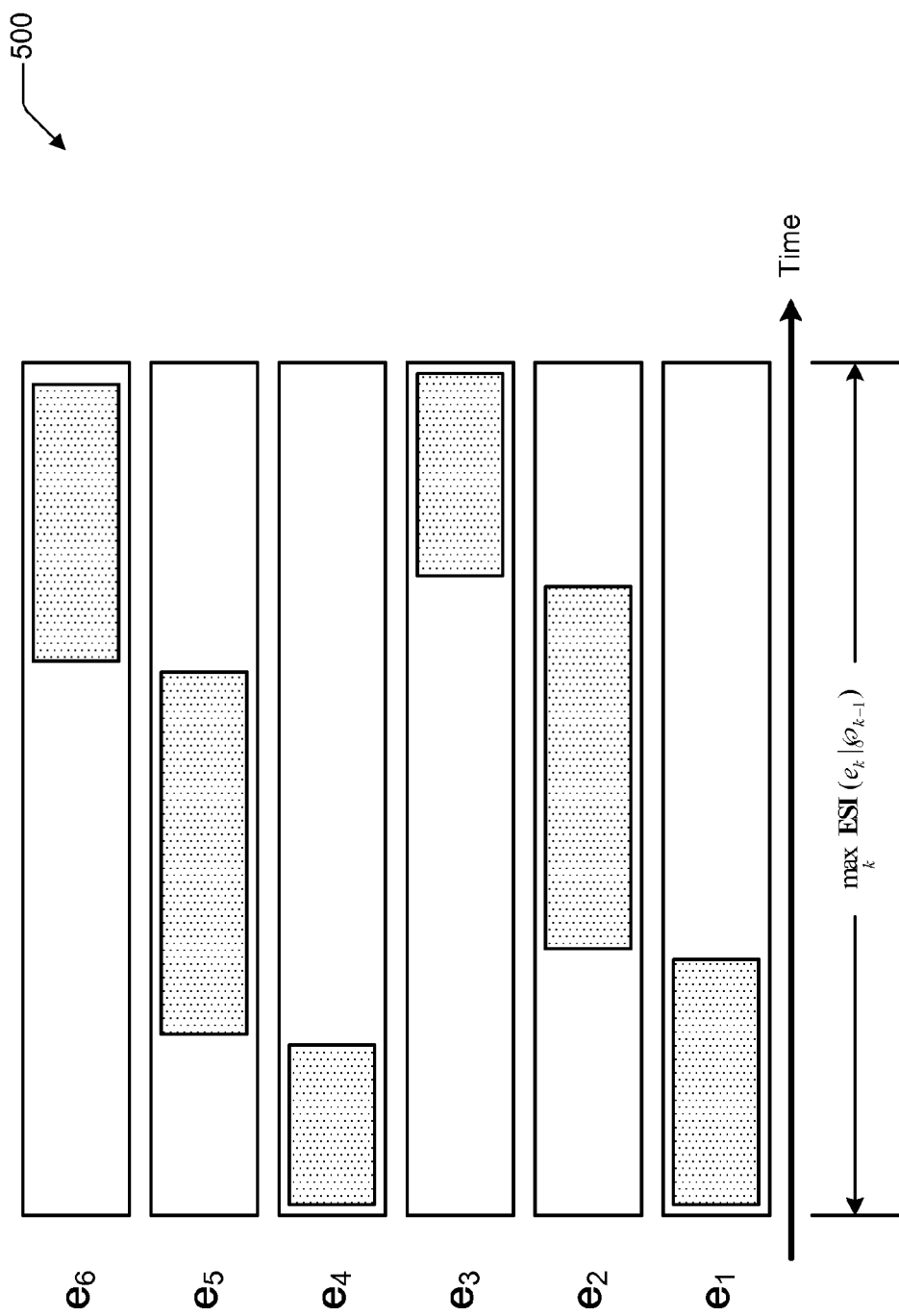
FIG. 5 is a block diagram of an example interference-free scheduling of six links with regard to an estimated service interval (ESI) at a bottleneck link.

We now apply a greedy-coloring-like algorithm for scheduling the links on a route. This is illustrated in FIG. 5 for a path with 6 links $e_1$ to $e_6$. FIG. 5 is a block diagram 500 of an example interference-free scheduling of six links with regard to an estimated service interval (ESI) at a bottleneck link. We visit the links on the route sequentially, from the first hop to the last hop. For each link $e_k$, find one or more intervals with a total length of $ETT(e_k)$. Similarly to greedy coloring, when assigning the intervals to a link, we only need to examine the previous links, but not future links. With this greedy scheduling process, we can finish the assignment in a total duration of $\max_k ESI(e_k \mid \wp_{k-1})$. If we repeat this scheduling pattern for a sufficiently long time, then we can deliver one packet end to end every $\max_k ESI(e_k \mid \wp_{k-1})$ (sec). Hence, the throughput is achievable.

The Theorem 1 above shows that the bottleneck ESI corresponds to a theoretically achievable throughput. Conversely, if a link $e_k$ interferes with a set ʂ of previous links, then typically links in ʂ∪{$e_k$} would be expected to mutually interfere (hence forming a clique in the conflict graph). If that indeed is the case, then we cannot deliver more than one packet end to end every $\max_k ESI(e_k \mid \wp_{k-1})$ (sec). Thus, this relatively non-rigorous argument shows that the maximum throughput is roughly around $\max_k ESI(e_k \wp_{k-1})$.

2.3 An Alternative System Model

In an example implementation as described above, we assumed without loss of generality that each radio interface is tuned to a fixed channel for an extended time duration. This is referred to herein as a "static" channel assignment.

However, there are alternative system models for using multiple radios in which each node has at least two radios. By way of example only, for each node some of its radio interfaces are fixed at certain channels and the remaining are tunable. To send a packet to a node v, a node tunes one of its tunable interfaces to one of node v's fixed interfaces. This model is referred to herein as a "semi-static" channel assignment. Under the semi-static model, to specify a route, we can specify the sequence of receiving interfaces (e.g., via their IP addresses, etc.). The ESI metric can therefore also be applied to the semi-static model with essentially no changes.

3. Context-Based Path Pruning

In this section, we describe example implementations of a second component of CRP: the CPP path selection algorithm. In addition to defining a good path metric, another challenge is to find the optimal (or near-optimal or at least superior) route under a given path metric. As a starting point, we first consider a link state routing framework. In link state routing, each router measures the cost to each of its neighbors, constructs a packet including these measurements, sends it to all other routers, and computes the shortest paths locally. A centralized algorithm for computing the shortest paths may therefore be adopted with link state routing. However, the CPP method can also be applied in some other, distributed settings. Examples of other settings and protocols are described herein below in Section 3.2, which is entitled "Applying CPP to Other Protocols".

The relatively simpler problem of finding the optimal path under a decomposable path metric is described first by way of review. In a decomposable path metric, each link has a non-negative cost, and the cost of a path is the sum of the costs of the constituting links. This problem is well understood. For example, the classical shortest path algorithm by Dijkstra can be applied to find the optimal path with complexity $O(|V^2|)$, where $|V|$ denotes the number of nodes in the network.

Dijkstra's algorithm maintains upper-bound labels $f(v)$ on the lengths of minimum-cost s-v paths for all $v \in V$. The label of each node is either temporary or permanent, throughout the execution of the algorithm. At each iteration, a temporary label with least total cost is made permanent and the remaining temporary labels are updated. Specifically, if $v^*$ has the minimum total cost among the temporary nodes, then we update the cost of every other temporary node w using equation (M3) below:

$$f(w):=\min\{f(w), f(v^*)+c(v^*w)\}. \qquad (M3)$$

In contrast, the SIM metric is history-dependent. As a result, finding the shortest path under the SIM metric is a new challenge. For example, a direct application of the Dijkstra's shortest path algorithm may lead to highly suboptimal paths with the history-dependent SIM metric. Consider the example shown in FIG. 6.

Figure 6:
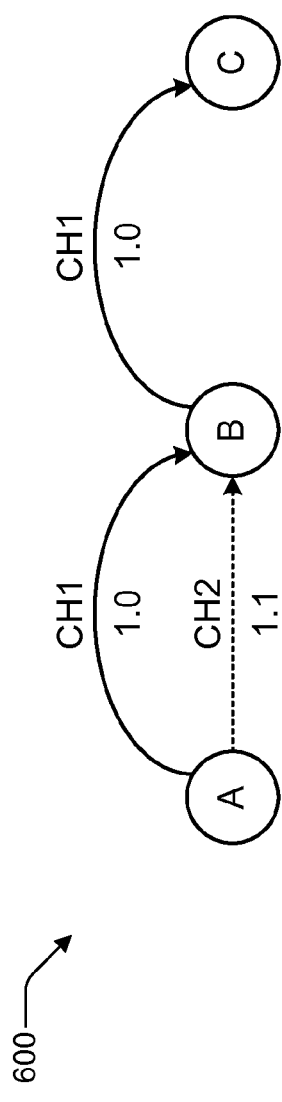
FIG. 6 is a graphical depiction of an example three-node network topology to illustrate a problem with using a conventional algorithm for path selection.

FIG. 6 is a graphical depiction of an example three-node network topology 600 to illustrate non-decomposable metrics. The three nodes are labeled A, B, and C. There are two orthogonal links from A to B over channels 1 and 2 (CH1 and CH2). There is one link from B to C over channel 1 (CH1). The ETT metrics for the links are shown under the links as being 1.0 or 1.1. Dijkstra's algorithm using equation (M3) returns a route that uses A –(CH1)→B –(CH1)→C. However, a better route is A –(CH2)→B –(CH1)→C.

The reason that Dijkstra's algorithm returns a suboptimal route is that it operates on an optimality principle: The shortest path from s to t via v is the shortest path from s to v concatenated with the shortest path from v to t. Consequently, each node only needs to remember the cost of the best s-v path. Such an optimality principle no longer holds for a metric such as SIM; instead, an s-v path $P_1$ may have a larger cost than an s-v path $P_2$ but still eventually lead to a lower overall cost toward the final destination node t.

We describe herein example implementations of a context-based path pruning (CPP) technique. It can be applied as a (heuristic) method for optimizing a context-based metric. To model the potential impact of past hops on future hops, we maintain a set of paths that reach each node v (instead of a single s-v path having minimum cost). Thus, a set of partial paths that reach each intermediate node as the partial paths are extended link-by-link toward a destination node are maintained.

An issue that arises is: How many paths should we store at each node as we search for a good s-t path? Storing all paths would apparently result in an exponential complexity. To keep the complexity manageable, we constrain the amount of memory at each node. It is observed that the effect of self-interference has a localized nature. Normally, given what happened in the recent past (i.e., the first few previous hops), the older history is unlikely to have a significant impact on the future.

This observation motivates us to organize the memory at each node according to several local contexts. Each local context can be viewed as a concise summary of the dominating history of all the partial paths that end with that local context, based on the observation that older history usually has less impact on the future. During an execution of a CPP algorithm, each node stores the current best (during the execution of the algorithm) path under each possible local context. The current best paths that are stored are considered further for potential expansion into an s-t path.

The local contexts can be defined in a number of manners. For example, we can define the local context of a path as the sequence of links in the last l hops. As another example, we can define the local context of a path as the sequence of channels taken by the links in the last l hops. Either of these definitions can provide reasonable summaries of the past that would impact the future. Other local context definitions can alternatively be adopted.

3.1 Dijkstra-Style Realization of CPP

In a described implementation, a CPP method can be performed using a Dijkstra-style instantiation. Algorithm 1 shows such an example Dijkstra-style instantiation of a CPP method. A pseudo-code version of an example CPP method is thus provided below as Algorithm 1.

---

Algorithm 1

INPUT: A function that can evaluate the cost of a path.
T := {s};/* The set of temporary paths. */
P := ∅;/* The set of permanent paths. */
while T ≠ ∅ do
    choose the path $\mathcal{P}^*$ from T with the minimum cost;
    T := T – $\mathcal{P}^*$; P := P + $\mathcal{P}^*$;
    for each valid extension of $\mathcal{P}^*$, say $\mathcal{P} = \mathcal{P}^* + e$,
    do
        e := LocalContext($\mathcal{P}$);
        If T ∪ P contains a path Q with local contest e
        then
            replace Q by $\mathcal{P}$ if it has a lower cost than $\mathcal{P}$;
        else
            T := T + $\mathcal{P}$;
        end if
    end for
end while
OUTPUT: For each node v, find the best local context
e*(v) resulting in minimum cost. For each context e
of each node v, store the best link reaching it with
minimum cost. To recover a route from v to s, back-
track from e*(v) along the best links toward s.

---

With respect to the pseudo code in Algorithm 1 above, we maintain a set T of temporary paths and a set P of permanent paths. In each step, we choose the temporary path with minimum cost. Such a path, say $\mathcal{P}^*$, is made permanent. Then we consider the possible ways of extending $\mathcal{P}^*$ toward an s-t path. For each extension $\mathcal{P} = \mathcal{P}^* + e$, we determine its local context and search for a path with the same local context in T and P. If a path with the same local context already exists, then such an existing path is compared with ℘ and the winner is retained. If a path with the same local context does not exist, then ℘ is added to T.

Figure 8:
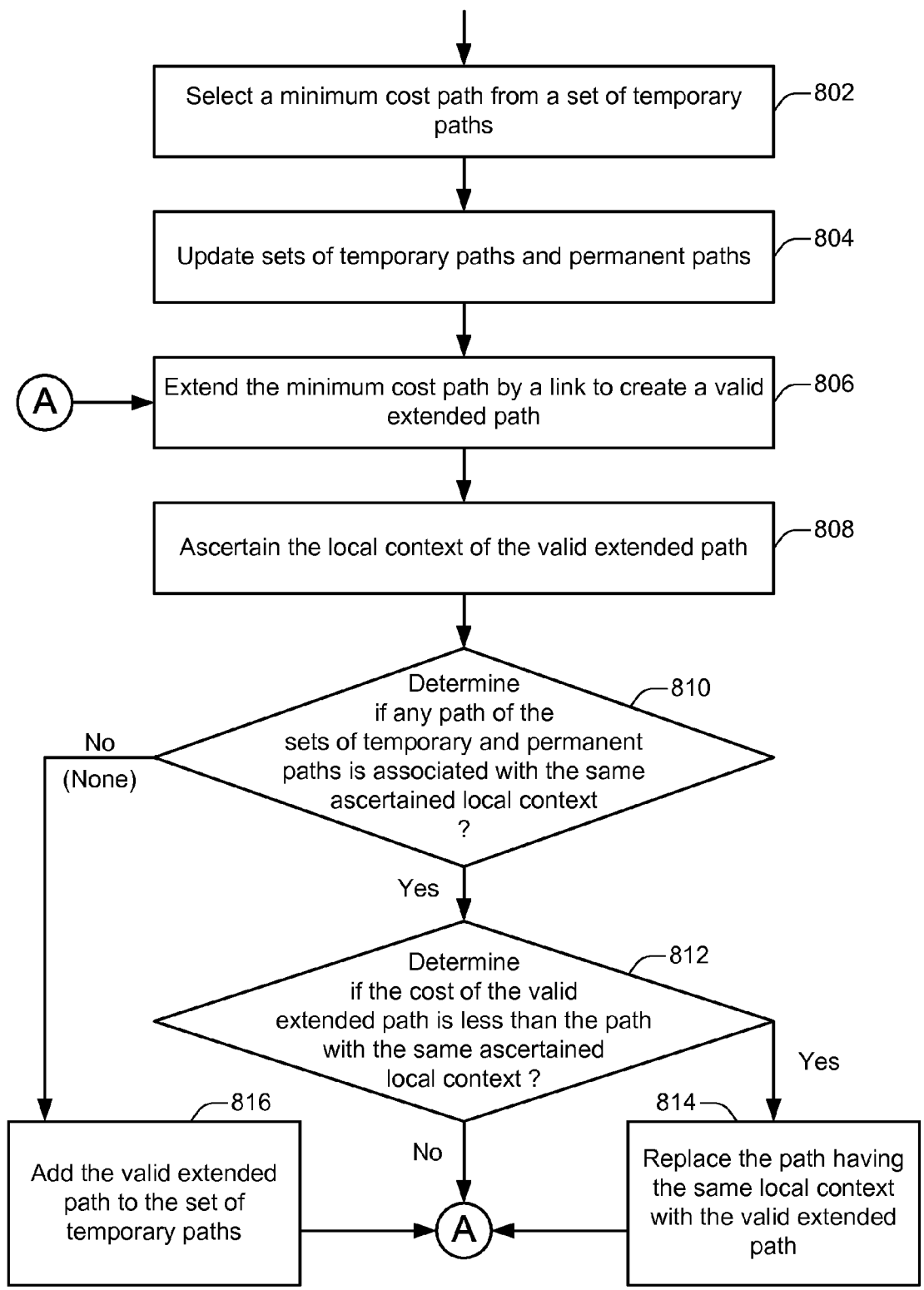
FIG. 8 is a flow diagram that illustrates an example of a method for context-based path pruning.

FIG. 8 is a flow diagram 800 that illustrates an example of a method for context-based path pruning. Flow diagram 800 includes eight (8) blocks 802-816 and parallels an implementation of Algorithm 1. Although the actions of flow diagram 800 may be performed in other environments and with a variety of hardware, firmware, software, and fixed logic circuitry combinations, a network node 102 (of FIGS. 1 and 2) may be used, by way of example only, to implement the method of flow diagram 800.

In a described implementation, starting at block 802, a minimum cost path is selected from a set of temporary paths. At block 804, the sets of temporary paths and permanent paths are updated. For example, the selected path may be removed from the set of temporary paths, and the selected path may be added to the set of permanent paths. At block 806, the selected minimum cost path is extended by a link to create a valid extended path. At block 808, the local context of the valid extended path is ascertained using a predetermined function.

At block 810, it is determined if any path from the set of temporary paths or the set of permanent paths is associated with the same ascertained local context. If not (if there are no others with the same local context), then at block 816 the valid extended path is added to the set of temporary paths.

If there is a path with the same local context (as determined at block 810), then at block 812 it is determined if the cost of the valid extended path is less than the path with the same ascertained local context. If so, then at block 814 the path having the same local context is replaced with the valid extended path. If not, then the minimum cost path is extended by a different link (at block 806). The minimum cost path is also extended by a different link (at block 806) after blocks 814 and 816. Although not specifically indicated in FIG. 8, flow diagram 800 may be repeated from block 802 until the set of temporary paths is empty.

An alternative approach to understanding and implementing a CPP method is described below. For each physical node v, we introduce one vertex $v_c$ for each local context c that is applicable to v, and we interconnect the vertices according to the original connectivity. We denote such a context-expanded graph by $G_c$. Algorithm 1 can be interpreted as applying the Dijkstra's algorithm to the expanded graph $G_c$ to find a shortest path tree in $G_c$.

When employing path metrics (such as SIM) that are not decomposable, the cost update step needs to be revised. Instead of using equation (M3) above, node v* first reconstructs the current best path from the source, say $$s \overset{\wp}{\sim} \to v^*.$$

Then each neighbor node w of v is updated using equation (M4) below:

$$f(w) := \min\left\{f(w), \text{cost}\left(s \overset{\wp}{\sim} \to v^* \to w\right)\right\}, \quad \text{(M4)}$$

where cost(•) returns the path metric. Thus, first, a current best path from a source node to an intermediate node is reconstructed. Then, a context-based routing metric for a particular local context is updated responsive to a path value calculated on a path extending from the source node to a neighbor node of the intermediate node along the reconstructed current best path.

Figure 7:
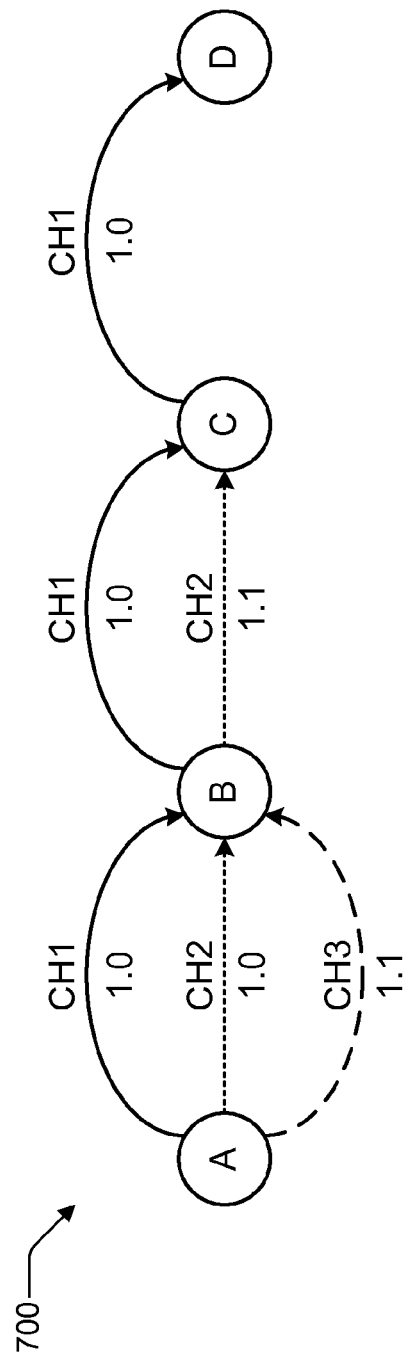
FIG. 7 is a graphical depiction of an example four-node network topology having up to three orthogonal channels to illustrate a context-based path pruning technique.

We now illustrate this context-expanded graph using an example four-node scenario as shown in FIG. 7, which is a graphical depiction of an example four-node network topology 700 having up to three orthogonal channels to illustrate a context-based path pruning technique. These four nodes are labeled A, B, C, and D. There are three orthogonal links from A to B, two orthogonal links from B to C, and one link from C to D. The channel numbers (CH#) are shown above the link, and the ETT metrics are shown below the links. For the sake of clarity, consider β=0.5 and the simplified interference model noted above in Section 2.2 "ESI of the Bottleneck Link". In this example, Dijkstra's algorithm using equation (M4) for non-decomposable path metrics returns A –(CH1)→B –(CH2)→C –(CH1)→D, with a total cost of 2.55.

Figure 9A:
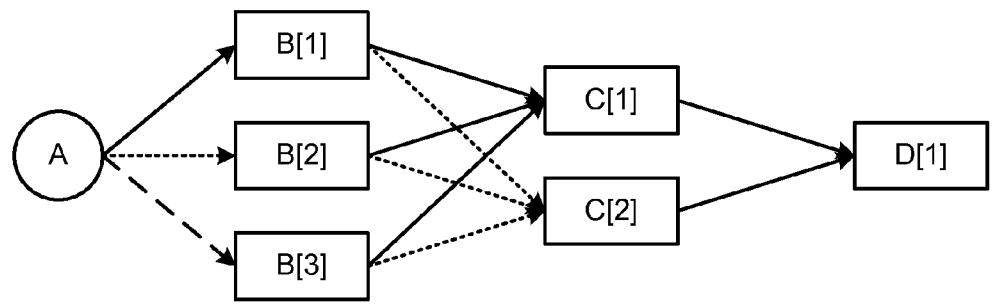
FIG. 9A is a block diagram illustrating an example expanded graph of the four-node network of FIG. 7 with the expanded graph reflecting local contexts that are defined by the previous hop's channel ID.

FIG. 9A is a block diagram illustrating an example expanded graph 900A of the four-node network of FIG. 7 with the expanded graph reflecting local contexts that are defined by the previous hop's channel ID. Here X[i] corresponds to the local context where the incoming link is on channel i. Taking the original node B as an example, there are three nodes in $G_c$, which are associated with three channels to reach node B. These nodes are B[1], B[2], and B[3].

To connect Algorithm 1 with running Dijkstra's algorithm (with equation (M4)) over the expanded graph, we can view each node as storing the current best path with which it is reached from the source. The current best path can be obtained by backtracking along the best links that reach each node. With a one-hop-based local context as shown in FIG. 9, the route found is A –(CH2)→B –(CH1)→C –(CH1)→D, with a total cost of 2.5.

Figure 9B:
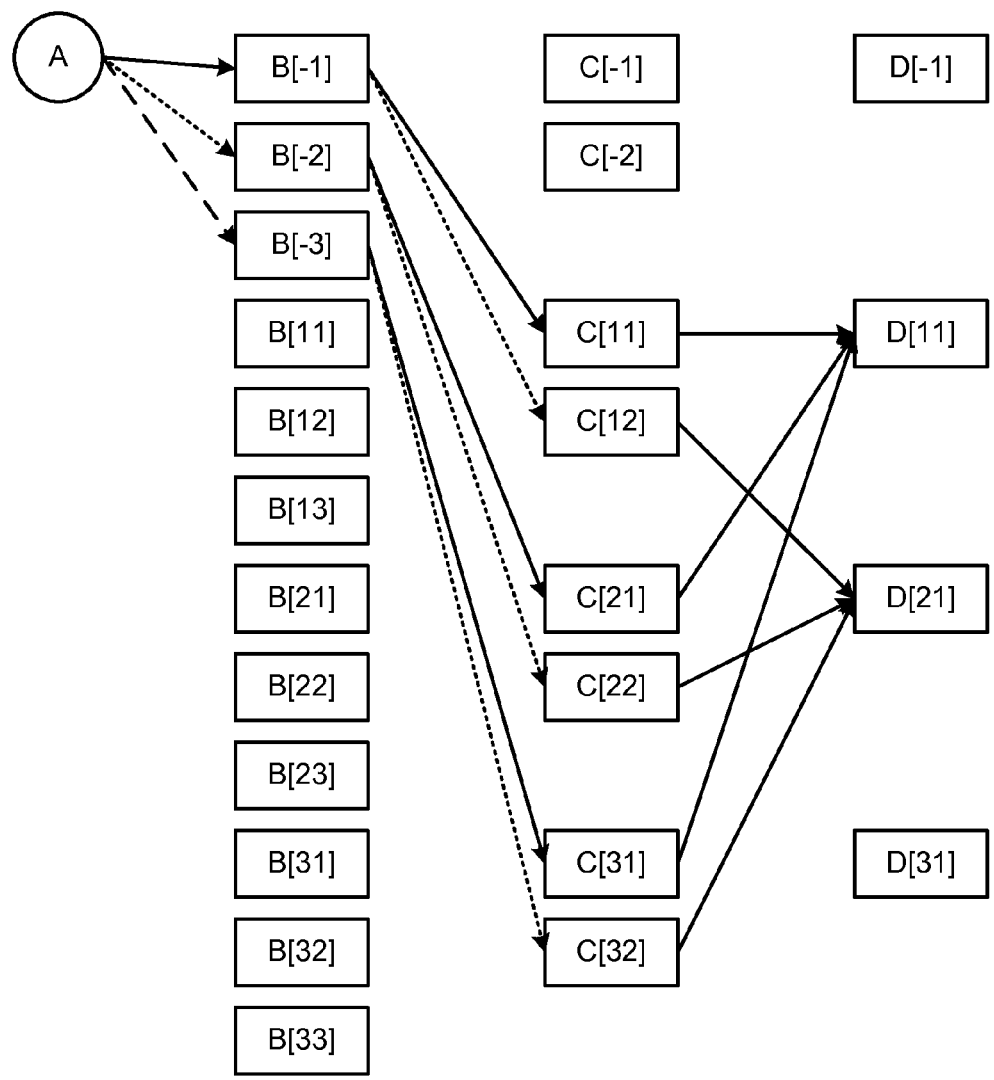
FIG. 9B is a block diagram illustrating an example expanded graph of the four-node network of FIG. 7 with the expanded graph reflecting local contexts that are defined by the previous two hop's channel IDs.

FIG. 9B is a block diagram illustrating an example expanded graph 900B of the four-node network of FIG. 7 with the expanded graph reflecting local contexts that are defined by the previous two hop's channel IDs. Here X[ij] corresponds to the context where this node is reached via a link in channel i, followed by a link in channel j. X[–j] refers to the local context where this node is directly reached from the source via a link in channel j. Running Dijkstra's algorithm (with equation (M4)) over this expanded graph yields the optimal route A –(CH3)→B –(CH2)→C –(CH1)→D, with a total cost of 2.1.

3.1.1 Optimality

If the path metric indeed has a fixed memory span (say, 1 hop), then a CPP technique with the local context defined by the 1-hop links is guaranteed to find the optimal solution (because no pruning step is suboptimal). Other metrics, however, may have a longer memory span. The SIM path metric, for example, has a memory span that can potentially involve the entire path history. Nevertheless, even if a selected path metric has a longer memory span than the length of the local contexts, the CPP method can still be applied as an effective heuristic method.

3.1.2 Complexity

As noted above, Algorithm 1 can be essentially viewed as applying Dijkstra's algorithm with equation (M4) over the expanded graph. With Algorithm 1, however, the involved vertices and links are constructed on the fly, without explicitly maintaining the expanded graph. Due to the connection between Algorithm 1 and Dijkstra's algorithm, we can easily conclude that the time complexity of Algorithm 1 is $O(C^2)$, where C is the total number of local contexts at all nodes.

If we define the local context of a path as the sequence of channels taken by the links in the last l hops, then C is upper-bounded by $(K+K^2+\ldots+K^l)*|V(G)|$, where K is the number of channels in the system and V(G) is the set of nodes in the original network. Although other values of l may be adopted, for an example practical implementation with current hardware/software/processing technologies, we specifically propose to use l=2. For this example, l=2 leads to a specific complexity that is given by equation (M5) below:

$$O(((K+K^2)\cdot|V|)^2). \tag{M5}$$

3.2 Applying CPP to Other Protocols

The CPP method is a general method to efficiently explore the path space. It can also be applied to other scenarios in other settings including, but not limited to, distance vector protocols, on-demand route discovery, and so forth.

First, we describe how CPP can be implemented in a framework based on the Bellman-Ford shortest path algorithm. The Bellman-Ford algorithm maintains for each node v first the minimum cost s-v path with 0 interior nodes, then the minimum cost s-v path with $\leq 1$ interior node, then the minimum cost s-v path with $\leq 2$ interior nodes, and so on. Similar to what is described above for Dijkstra's method, to use the CPP method, we essentially can run the Bellman-Ford algorithm over the context-expanded graph $G_c$. Specifically, we maintain a set $Q_k$ of paths. For k=1 to $|V(G)|-2$, we consider the paths in the $Q_k$ set one by one. For each path $\wp^*$ in consideration, we examine all possible paths obtained by extending $\wp^*$ by one more hop. For each extended path $\wp=\wp^*+e$, we then check if there exists a path Q in the current set with the same local context. If not, the extended path $\wp$ is inserted into the set; otherwise, the path $\wp$ is compared with the existing path Q and the better is retained.

The practical counterpart of Bellman-Ford's algorithm is the distance vector protocol (e.g. DSDV). Originally, each router maintains a table (i.e., a vector) giving the best known cost to reach each destination and the associated interface(s). Tables are updated by exchanging information with neighbor nodes. To adapt to our current context-expanded graph scenario, first we construct the context-expanded graph in a reverse manner.

Figure 10:
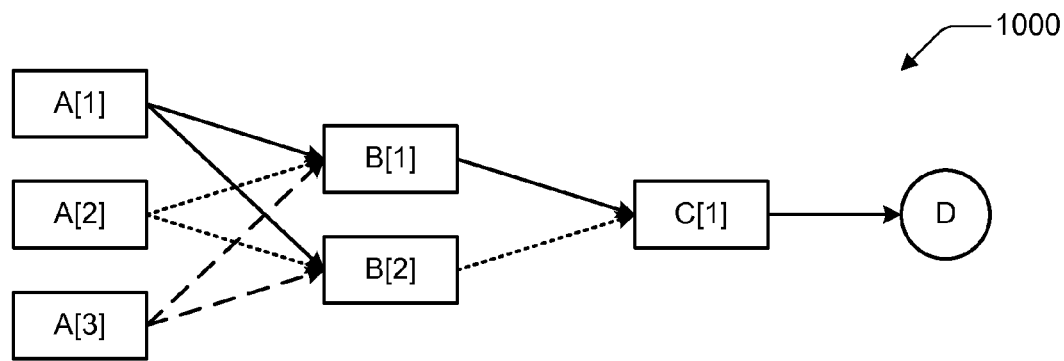
FIG. 10 is a block diagram illustrating an example reverse context-expanded graph of the four-node network of FIG. 7, with the reverse context-expanded graph reflecting local contexts that are defined by the outgoing channel.

FIG. 10 is a block diagram illustrating an example reverse context-expanded graph 1000 of the four-node network of FIG. 7, with the reverse context-expanded graph reflecting local contexts that are defined by the outgoing channel. Because the expanded vertices $\{v_c\}$ do not physically exist, we let each physical node play their roles. Nodes exchange the current best paths to reach each physical destination in the reverse expanded graph. Once every T milliseconds each router u sends each neighbor a list of its estimated minimum costs to reach each physical node v for each applicable outgoing context c. For example, C announces that it has a path to D; then B announces that it has two paths to D: B –(CH1)→C –(CH1)→D and B –(CH2)→C –(CH1)→D. Next, A announces that it has three (=number of local contexts) paths to D: A –(CH1)→B –(CH2)→C –(CH1)→D; A –(CH2)→B –(CH1)→C –(CH1)→D; and A –(CH3)→B –(CH2)→C –(CH1)→D. If A needs a route to D, then A identifies the last one as the best path.

CPP can also be applied to on-demand route discovery protocols including, but not limited to, dynamic source routing (DSR), DSR with ETX, and so forth. In DSR, a source node broadcasts route request packets to discover routes to a destination. When a node forwards a route request, it appends its address and the related link costs. To implement CPP in DSR, when a node receives a request it has already forwarded, it forwards it again if the path cost to a neighbor v is better than the best which it has already forwarded with the same local context.

4. Alternative Applications for Context-Based Routing

Context-based routing may be implemented in applications that extend beyond self-interference aware routing. In this section, alternative implementations and applications of context-based routing are described.

Network Coding: Network coding has been proposed as a link layer enhancement technique for wireless networks. Consider a 3-node chain A-B-C with two opposite flows A→C and C→A. In this case, the middle node B can XOR two packets traveling in opposite directions thereby reducing the transmissions required for packet exchange from 4 down to 3 transmissions. However, previous schemes proposed for network coding are opportunistic and critically depend on the traffic pattern in the network and thus the routing decisions. To increase the benefit of network coding, routes that create more mixing opportunities can be ascertained and selected. Context-based routing can be applied in such scenarios.

Figure 11:
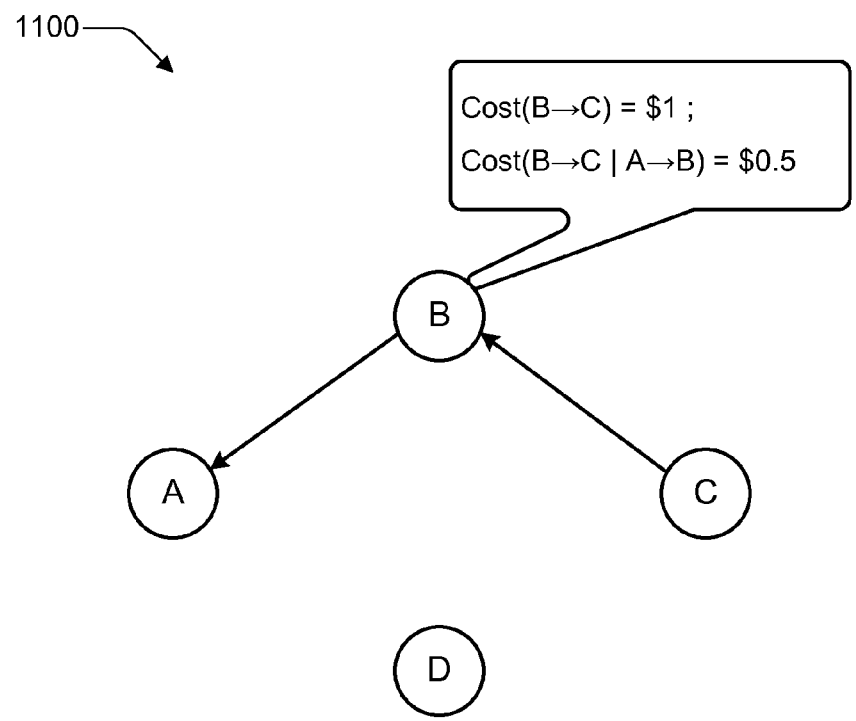
FIG. 11 is a block diagram illustrating how context-based routing can help find routes that increase network coding opportunities.

FIG. 11 is a block diagram 1100 illustrating how context-based routing can help find routes that increase network coding opportunities. Block diagram 1100 includes four nodes A, B, C, and D. Thus, a 4-node local environment having nodes A, B, C, and D is considered with reference to FIG. 11. Suppose there is an existing flow, C→B→A. Assume we want to find a route from A to C. In this case, the route A→B→C is better than A→D→C, because the former route creates network coding opportunities. An issue is how to realize algorithmically that A→B→C is a better route.

Node B knows that a packet arriving from A and going to C can be mixed with the background flow. Consequently, node B can announce a lower conditional cost for a cost (B→C|A→B) to attract new flows to adopt a route that can be mixed with the background flows. With the illustrated example, node B announces that the cost(B→C) equals \$1 generally. However, it also announces that the cost (B→C|A→B) equals half of the general amount. The lower cost is justified by the lower resource that the path consumes. In this network coding scenario, the path metric has a one-hop memory; hence, the CPP method can find the optimal route.

Furthermore, it is possible to combine multiple context-based metrics in systems where context is required to model multiple phenomena. As an example, we can potentially perform route selection in a wireless network with multiple radios as well as local mixing. To that end, but by way of example only, "Routing with a Markovian Metric to Promote Local Mixing" is described in greater detail herein below.

Multicast: While the description above applies context-based routing to multi-radio unicast, context-based routing can also be applied to optimize multicast trees in multi-radio networks.

Optical Networks: The problem of choosing light-paths in a WDM optical network has some synergy with a wireless network equipped with multiple radios. Each optical router has multiple incoming wavelengths and outgoing wavelengths. Some costlier devices can also perform wavelength conversion. Thus, the cost of choosing an outgoing wavelength can depend on context. For example, the cost can depend on the incoming wavelength and the cost of conversion.

5. Conclusion: Context-Based Routing in Multi-Radio Mesh Networks

In the description above, we present example implementations for routing metrics and route selection performed in multi-radio wireless networks. Context information can be used to enhance, if not optimize, routes when interdependencies between links in a path exist. An example context-based metric that is described herein above is the SIM metric. An associated context-based route selection method, the CPP method, is also described. Although they may be implemented separately, they jointly provide an effective way for performing interference-aware routing in multi-radio networks. CRP can find good routes when frequency reuse is possible, heterogeneous nodes exist in the network, and/or transient bottlenecks occur. Hence, it is a good general purpose routing protocol for multi-radio wireless network meshes.

Example Implementations for Routing with a Markovian Metric to Promote Local Mixing 1. Introduction: Routing with a Markovian Metric to Promote Local Mixing Network coding refers to a scheme where a node is allowed to generate output data by mixing (i.e., computing certain functions of) its received data. The broadcast property of, e.g., the wireless medium renders network coding particularly useful.

Figure 12:
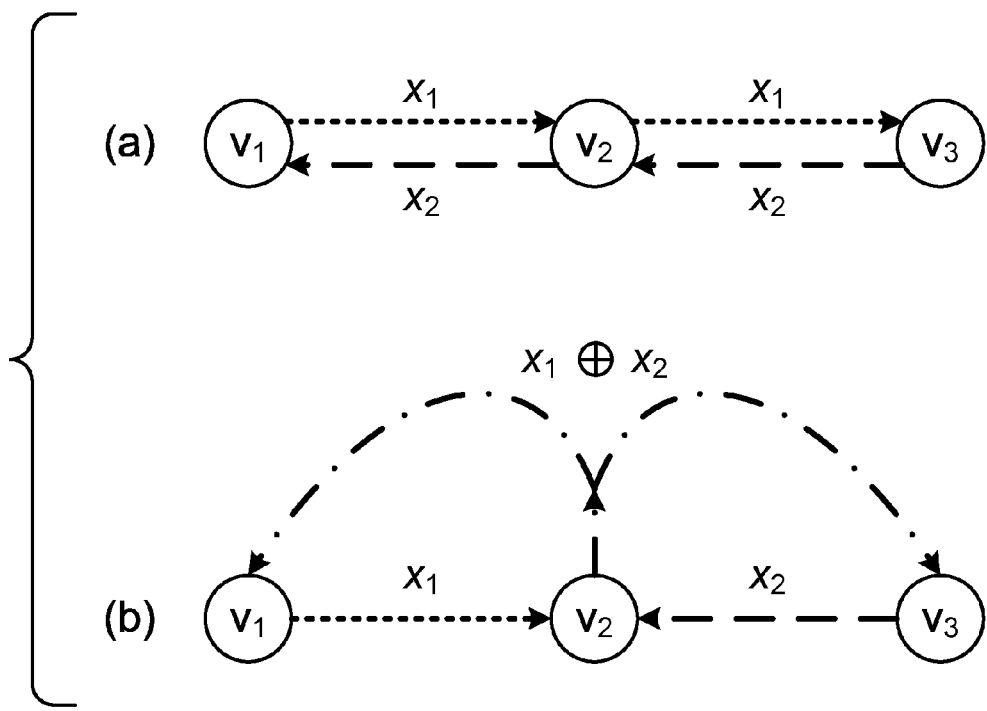
FIG. 12 is a graphical depiction of an example three-node network topology to illustrate how transmissions can be saved using local mixing/network coding.

Consider nodes $v_1, v_2, v_3$ on a line, as illustrated in FIG. 12. FIG. 12 is a graphical depiction of an example three-node network topology 1200 to illustrate how transmissions can be saved using local mixing/network coding. Suppose $v_1$ wants to send packet $x_1$ to $v_3$ via $v_2$ and $v_3$ wants to send packet $x_2$ to $v_1$ via $v_2$. A conventional solution without network coding requires 4 transmissions over the air. This non-network coding approach is illustrated in FIG. 12(a). Using network coding, on the other hand, this packet exchange can be performed using 3 transmissions. This network coding approach is illustrated in FIG. 12(b).

The principles illustrated in FIG. 12 can be generalized to a chain of nodes. For packet exchanges between two wireless nodes along a line, the consumed channel resources can potentially be halved. Such advantages can be realized in practice. For example, each wireless router can examine its local buffer and mix a left-bound packet with a right-bound packet (here "left" and "right" are in the relative sense). Such a mixture packet can be de-mixed by the left and right neighbors.

As another example, a framework for exploiting network coding and the broadcast medium to improve the efficiency of unicasting in multi-hop wireless networks has been presented. Each node snoops on the medium and buffers packets it has heard. A node also informs its neighbors which packets it has overheard. This allows nodes to know roughly what packets are available at each neighbor (i.e., "who has what?"). Knowing "who has what" in the neighborhood, a node examines its pending outgoing packets and decides how to form output mixture packets, with the objective of most efficiently utilizing the medium.

Figure 13:
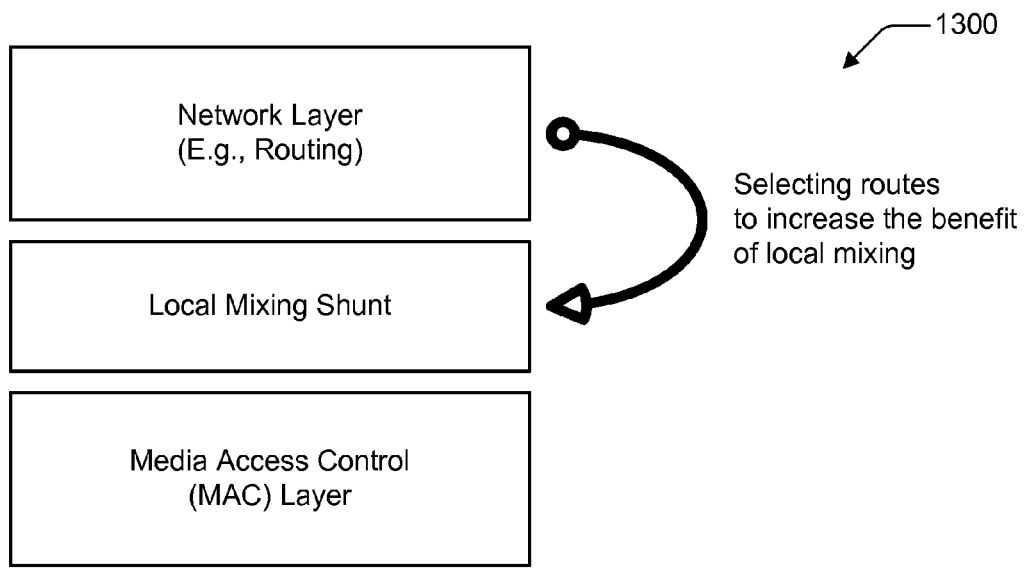
FIG. 13 is a block diagram showing an example network layer relationship for routing to promote local mixing with a local mixing engine shunt.

Thus, a link layer enhancement scheme can be implemented in the networking stack. FIG. 13 is a block diagram showing an example network layer relationship 1300 for routing to promote local mixing with a local mixing engine shunt. As is illustrated in FIG. 13, the local mixing engine sits above the MAC layer (e.g., for IEEE 802.11) and below the network layer (e.g., for routing). Given the routing decisions, the local mixing engine tries to identify mixing opportunities. It has been shown that local mixing can improve the link layer efficiency. The gain of this technique, however, depends on the traffic pattern in the network. Thus, the description herein below involves making routing decisions that increase, if not maximize, the benefits offered by the local mixing engine.

By way of example only, the description herein below focuses on wireless mesh networks (e.g., static multi-hop wireless networks). However, the described implementations and principles are applicable to other wireless networks and/or wired networks. State-of-the-art routing protocols for wireless mesh networks have traditionally been based on finding shortest paths under certain cost metrics. The simplest path metric is the hop count. However, various link quality metrics have also been proposed for static wireless mesh networks. These metrics include, by way of example but not limitation, the per-hop round-trip time (RTT), the expected transmission count (ETX), the expected transmission time (ETT), and so forth.

Figure 14:
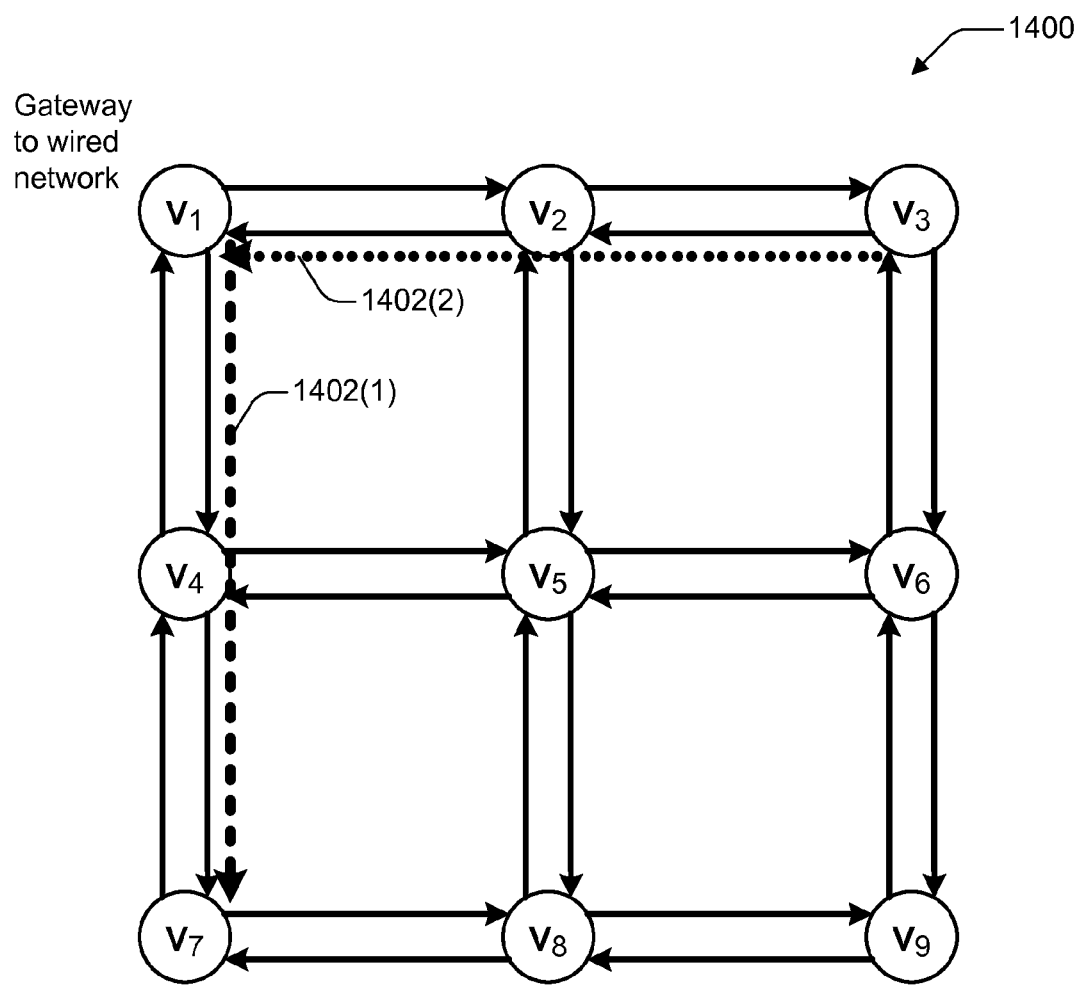
FIG. 14 is a graphical depiction of an example nine-node mesh network topology having two long-term background flows.

One approach is to modify the link metrics to take into account the effect of the local mixing engine in reducing the transmissions over the air. This, however, is not straightforward. Consider the example setting illustrated in FIG. 14. FIG. 14 is a graphical depiction of an example nine-node mesh network topology 1400 having two long-term background flows 1402(1) and 1402(2). These two long-term flows in the network are: $v_3 \rightarrow v_2 \rightarrow v_1$ (1402(2)) and $v_1 \rightarrow v_4 \rightarrow v_7$ (1402(1)).

We want to find a good routing path from $v_1$ to $v_9$. Due to the existence of the local mixing engine, the route $v_1 \rightarrow v_2 \rightarrow v_3 \rightarrow v_6 \rightarrow v_9$ is a good solution because the packets belonging to this new flow can be mixed with the packets belonging to the opposite flow $v_3 \rightarrow v_2 \rightarrow v_1$, resulting in improved resource efficiency. To encourage using such a route, link $v_2 \rightarrow v_3$ can announce a lower cost. There are some issues in doing so, because a packet from $v_5$ that traverses $v_2 \rightarrow v_3$ may not share a ride with a packet from $v_3$ that traverses $v_2 \rightarrow v_1$, although a packet from $v_1$ that traverses $v_2 \rightarrow v_3$ can.

The example above reveals that in the presence of the local mixing engine, assessing the channel resource incurred by a packet transmission involves some context information about where the packet arrives from. For example, we can say that given the current traffic condition, the cost for sending a packet from $v_2$ to $v_3$ that previously arrives from $v_1$, is smaller. An observation here is the relevancy of defining link cost based on some context information. This leads to the concept of a Markovian metric, which is described below.

2. Markovian Metric

A conventional routing metric models the cost of a path as the sum of the costs on the individual links. In contrast, an example Markovian metric introduces context information into the cost modeling. The cost of sending a packet (or a stream of packets) across a link is thus allowed to depend on where the packet (or the stream) arrived from. The cost of a path is modeled as the cost of the first hop, plus the cost of the second hop conditioned on the first hop, and so on.

Definition 1 (example Markovian metric): Consider a path $\wp = v_0 \rightarrow v_1 \rightarrow \ldots \rightarrow v_k$. A Markovian metric models the cost of a path as the sum of the conditional costs on the links as is shown by equation (L1), with "L" denoting a local mixing embodiment:

$$\text{cost}(\wp) \triangleq \text{cost}(v_0 \rightarrow v_1) + \text{cost}(v_1 \rightarrow v_2 \mid v_0 \rightarrow v_1) + \ldots + \text{cost}(v_{k-1} \rightarrow v_k \mid v_{k-2} \rightarrow v_{k-1}). \quad (L1)$$

In equation (L1) above, cost(b→c|a→b) denotes the cost of sending a packet from b to c, conditioned on that the packet arrived at b from a.

The conventional routing metric can be viewed as a special case of the Markovian metric where all of the conditional link costs are equal to their unconditional counterparts. The decomposition relation of equation (L1) is reminiscent of the decomposition of the joint probability distribution of random variables forming a Markov chain into a product of the conditional probabilities. Thus, a Markovian metric to an unconditional metric is like a Markov chain to a memoryless sequence of random variables.

Due to this decomposition structure, the dynamic programming principle still applies. Hence, finding the shortest path with a Markovian metric can still be done in polynomial time. In a practical network, support for the Markovian metric can be added relatively easily into an existing routing framework that uses a conventional routing metric.

2.1 The Dot Graph Representation

Properly defining the conditional and unconditional link costs and computing them are central issues in the applications of a Markovian metric. A relatively concrete example can be found below in Section 3, which is entitled "Markovian Metric for Local Mixing". In this section, we assume that we are given a set of unconditional link costs $W_{uncon}$ and a set of conditional link costs $W_{con}$. For ease in notation, we use $w_{i,j}$ to denote an unconditional link cost "$cost(v_i \to v_j)$" and $w_{i,j,k}$ to denote a conditional link cost "$cost(v_j \to v_k | v_i \to v_j)$".

Figure 15:
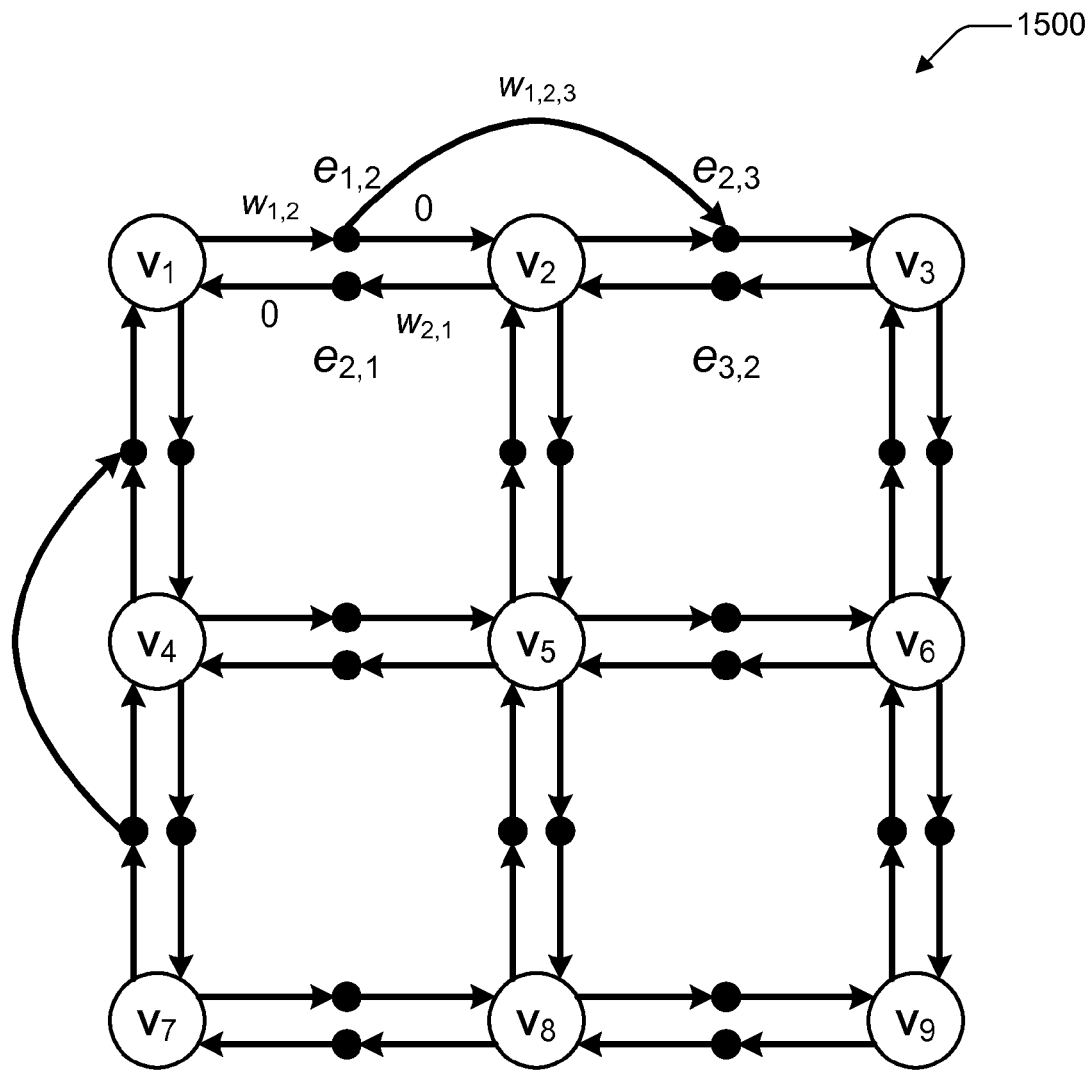
FIG. 15 is a graphical depiction of an example nine-node mesh network topology that illustrates conditional and unconditional link costs.

A graphical representation of these costs, which is termed herein the dot graph, is described below. We denote the original graph by G and the resulting dot graph by $\dot{G}$. For the example network in FIG. 14, the graphical representation of the link costs is illustrated in FIG. 15. FIG. 15 is a graphical depiction of an example nine-node mesh network topology 1500 that illustrates conditional and unconditional link costs. In this example, we assume each unconditional link cost is 1 and there are two conditional costs: $w_{1,2,3}=0.5$ and $w_{7,4,1}=0.5$. For instance, here $cost(v_2 \to v_3 | v_1 \to v_2) < cost(v_2 \to v_3)$ because a packet from $v_2$ to $v_3$ that arrived from $v_1$ can be mixed with the existing traffic in the flow $v_3 \to v_2 \to v_1$.

In a described implementation, to produce $\dot{G}$, we first add to G a dot for each directed link in the original graph, which "splits" the original link into two halves. Thus, there is a one-to-one correspondence between the links in the original graph G and the dots in $\dot{G}$. With slight abuse of notation, we refer to these dots as the names for the links in G; for example, the dot that splits the link from $v_1$ to $v_2$ is referred to as $e_{1,2}$. Therefore, $\dot{G}$ has $|V(G)|+|E(G)|$ nodes.

Second, for each conditional link cost "$cost(v_j \to v_k | v_i \to v_j)$" in the given set $W_{con}$, we draw an edge from the dot $e_{ij}$ to the dot $e_{jk}$. These edges, together with the edges generated by splitting the original links, constitute the edge set of the dot graph. To distinguish from the edges in the original graph, we call an edge in the dot graph a wire. Therefore, $\dot{G}$ has $2|E(G)|+|W_{con}|$ wires.

Third, we associate a cost label with each wire in $\dot{G}$. The cost of a wire from a physical node $v_i \in V(G)$ to a dot $e_{i,j} \in V(\dot{G})$ is the given unconditional cost of the link, $w_{ij}$. The cost of a wire from a dot $e_{i,j} \in V(\dot{G})$ to a physical node $v_j \in V(G)$ is 0. The cost of a wire from a dot $e_{i,j} \in V(\dot{G})$ to another dot $e_{j,k} \in V(\dot{G})$ is $w_{i,j,k}$, the given conditional cost of the link.

In general, we allow the coexistence of a conditional cost and unconditional cost for the same link, e.g., a cost $(b \to c | a \to b)$ and a $cost(b \to c)$. We assume the conditional link cost is less than or equal to its corresponding unconditional link cost. This is without loss of generality because we can define the unconditional cost on a link as the maximum of the corresponding conditional link costs. The meaning is intuitive: The unconditional link cost represents a conservative estimate of the cost incurred; given further context information, the cost may be lower. For example, in FIG. 15, $w_{1,2,3}=0.5 < w_{2,3}=1$; intuitively, there is a "short cut" from $e_{1,2}$ to $e_{2,3}$.

2.2. Minimum Cost Routing Using a Markovian Metric

For a described implementation and from an intuitive perspective, the dot graph models the existence of short cuts at various places in the network. It is easy to see that a path in the dot graph G maps into a route in the original network and that the cost of the route is the total cost along the path in $\dot{G}$. For instance, consider a path $\wp_1$ from $v_1$ to $v_9$ in $\dot{G}$ with the path identified by enumeration (L2) below:

$$v_1 \to e_{1,2} \to e_{2,3} \to v_3 \to e_{3,6} \to v_6 \to e_{6,9} \to v_9. \quad (L2)$$

The above path enumeration (L2) corresponds to the physical route $v_1 \to v_2 \to v_3 \to v_6 \to v_9$. The cost of the path is: $w_{1,2}+w_{1,2,3}+w_{3,6}+w_{6,9}=3.5$. In comparison, consider the path $\wp_2$ that is identified by enumeration (L3) below:

$$v_1 \to e_{1,4} \to v_4 \to e_{4,7} \to v_7 \to e_{7,8} \to v_8 \to e_{8,9} \to v_9. \quad (L3)$$

The above path enumeration (L3) corresponds to the physical route $v_1 \to v_4 \to v_7 \to v_8 \to v_9$, which has a cost of 4. Therefore, path $\wp_1$ is better than path $\wp_2$.

More generally, to find the minimum cost route between two physical nodes, a shortest path algorithm is applied over the dot graph. For example, with Dijkstra's algorithm, the complexity is $O(|V(\dot{G})|^2)$. Irrelevant dots in $\dot{G}$ can be removed. In other words, a dot $e_{i,j}$ may be introduced only if there is a need to express a related conditional link cost, e.g., when $W_{con}$ includes a cost $w_{i,j}*$ or $w*_{i,j}$. (Here, the asterisk symbol "*" is used as a wildcard.) By excluding the irrelevant dots, the number of vertices in the dot graph can be reduced to $O(|V(G)|+\min\{|E(G)|, 2|W_{con}|\})$.

Proposition 1 (Min-Cost Routing w/Markovian Metric): Given a set of unconditional link costs $W_{uncon}$ and a set of conditional link costs the minimum cost routing from a source node s to a destination or sink node t can be found by running a shortest path algorithm over the dot graph. This can be done in complexity $O((|V(G)|+\min\{|E(G)|, 2|W_{con}|\})^2)$.

2.3 Adaptive Routing in a Practical Network

The dot graph representation makes it easier to see how to modify the existing routing protocols for a Markovian metric system. Essentially, a physical node $v_i$ plays several characters in a distributed routing algorithm, including those of its neighboring dots that do not physically exist. In particular, by way of example only, the computational responsibility can be divided as follows. Let each physical node $v_i$ be responsible for its own outgoing wires of $v_i$ plus the outgoing wires of its incoming dots $e*_{,i}$. For example, in FIG. 15 physical node $v_2$ implements the computation involving wires $e*_{,2} \to v_2$, $v_2 \to e_{2,*}$, $e_{1,2} \to e_{2,3}$. Example approaches to supporting a Markovian metric in two types of representative routing algorithms are described below.

1) Link State Routing: Example protocols in this category include OLSR, LQSR, and so forth. In link state routing, each router measures the cost to each of its neighbors, constructs a packet including these measurements, sends it to all other routers, and computes the shortest paths locally using this information.

To support a Markovian metric, the following changes are involved in a link state routing system. Each router can measure the unconditional and conditional costs along the links/wires it is responsible for and broadcast the measurements to all other routers. Take node $v_2$ in FIG. 15 as an example. Here $v_2$ needs to measure the unconditional costs to each neighbor, as well as the conditional costs of the form $cost(e_{i,2} \to e_{2,j})$.

2) Distance Vector Routing: An example protocol amongst other protocols in this category is DSDV. In distance vector routing (also known as the Bellman-Ford algorithm), each router maintains a table (i.e., a vector) giving the best known cost to reach each destination and which interface to use to get there. There tables are updated by exchanging information with the neighbors.

Let us start with a first-cut solution. Once every T milliseconds each router sends each neighbor a list of its estimated minimum cost to reach each destination. Since each physical node $v_i$ is also playing the roles of its incoming dots, a first-cut implementation aggregates the tables from $v_i$ and its incoming dots. For example, consider node $v_2$ in FIG. 15. This node $v_2$ is also responsible for playing the roles of $e_{1,2}$, $e_{3,2}$, $e_{5,2}$. Thus, the aggregated table includes one minimum cost from $e_{1,2}$ to $v_j$, for i=1, 3, 5 and all other such destinations. The estimated minimum cost to reach destination $v_j$ is denoted herein as $\text{cost}(e_{1,2} \sim \rightarrow v_i)$. Thus, in this case, the following equality (L4) holds:

$$\text{cost}(e_{3,2} \sim \rightarrow v_j) = \text{cost}(e_{5,2} \sim \rightarrow v_j) = \text{cost}(v_2 \sim \rightarrow v_j). \quad (L4)$$

Similar scenarios may occur whenever the conditional cost cannot lead to a lower route to the given node $v_j$. In these scenarios, sending both $\text{cost}(e_{3,2} \sim \rightarrow v_j)$ and $\text{cost}(e_{5,2} \sim \rightarrow v_j)$ is wasteful. To remove such redundancy, we can include in the table $\text{cost}(v_2 \sim \rightarrow v_j)$, and then $\text{cost}(e^*_{,2} \sim \rightarrow v_j)$ only if it is lower than $\text{cost}(v_2 \sim \rightarrow v_j)$. This more efficiently utilizes communication bandwidth.

3. Markovian Metric for Local Mixing

In this section, an example approach to using a Markovian metric to increase, if not maximize, the benefit of local mixing is described. An issue with this goal is properly defining the link costs and computing them. We begin the consideration of link metrics with the unconditional link metrics. Although other link metrics can be employed, one popular link quality metric is the expected transmission count (ETX). This metric estimates the number of transmissions, including retransmissions, needed to send a unicast packet across a link. It may be obtained by measuring the loss probabilities of broadcast packets between pairs of neighboring nodes.

The ETX metric can be viewed as a characterization of the amount of resource consumed by a packet transmission. With the local mixing engine, several packets may share a ride in the air. Naturally, the passengers can share the airfare. In effect, each participating source packet is getting a discount. Such a discount, however, cannot be accurately modeled by an unconditional metric such as ETX because the applicability of the discount depends on the previous hop of the packet.

In contrast, we therefore describe a conditional link metric termed herein the expected resource consumption (ERC) metric, which models the cost saving due to local mixing. Consider a packet sent in the air. If it is a mixture of k source packets, then each ingredient source packet is charged 1/k the resource consumed by the packet transmission. The resource consumed by the transmission can be measured in terms of, e.g., air time, consumed energy, some combination thereof, and so forth.

3.1 Computation of Expected Resource Consumption (ERC)

We now describe an example scheme for computing the ERC. Each node maintains a table with wire information, such as a "WireInfoTable". Each row of the table contains the measured statistics about a wire, say $e_i \rightarrow e_{j,k}$, which crosses the current node $v_j$. The packets forwarded by the current node can be classified into categories associated with the wires. A packet that is received along $e_{i,j}$ and sent along $e_{j,k}$ falls into the category "$e_{i,j} \rightarrow e_{j,k}$".

For each wire category, we collect the total number of packets sent and the total resource consumed in a sliding time window. The total resource consumption is obtained by adding the resource consumption for each sent packet. Although other charging models may be employed, a relatively simple charging model is described herein. For example, if a source packet across wire $e_{i,j} \rightarrow e_{j,k}$ is sent in a mixture of 3 packets, we set the resource consumption of this source packet as ⅓ of the ETX of link $e_{j,k}$. Alternatively, other metrics can be used in lieu of ETX, such as ETT, and so forth.

To implement the sliding window computation efficiently, the time axis can be quantized into discrete slots of equal length. A sliding window of N slots is thus used. For each wire, we maintain a circular buffer of N bins; at any time, one of the N bins is active. At the start of each slot, we shift the active bin pointer once and clear the statistics in the new active bin. Each time a packet is transmitted in the air, we update the statistics in the current active bin accordingly. By way of example only, N may be set equal to 10 slots, each with a length of length 0.5 s. Other values of i and slot lengths may alternatively be used.

To evaluate the conditional link metric for a certain wire $e_{i,j} \rightarrow e_{j,k}$, we first obtain the ERC for each slot, say n, using equation (L5) below:

$$erc_n := \frac{\text{Resource consumed by } pkts \text{ sent in slot } n}{\# \text{ of packets sent in slot } n}. \quad (L5)$$

Then we compute the ERC for the wire as the weighted average of the ERCs for the slots using equation (L6) below:

$$ERC := \sum_{n=0}^{N-1} \alpha_n erc_n; \alpha_n = \alpha^{N-1-n}\left(\frac{1-\alpha}{1-\alpha^N}\right). \quad (L6)$$

Here the parameter $\alpha$ is the forgetting factor for old observations. Older observations receive lower weights. Although other values may be used, an example value for $\alpha=0.8$.

The measurement method described above generates an estimate of the current ERC, which is the ERC seen by a flow whose packets are currently being mixed. In addition to the current ERC, we collect another statistic called the marginal ERC, which is the ERC meant for a flow that has not been actively using the wire. The marginal ERC represents an estimate of the ERC if a small amount of new traffic is added to a particular wire $e_{i,j} \rightarrow e_{j,k}$. If the existing flows already use up most of the mixing opportunities, then the marginal ERC will likely not have a high discount. Both the current ERC and the marginal ERC are reported.

To compute the marginal ERC in a described implementation, an example rule is applied. Specifically, for a wire $e_{i,j} \rightarrow e_{j,k}$ in a given time slot, we examine the number of unmixed packets y in the reverse wire $e_{k,j} \rightarrow e_{j,i}$. If y is large enough, then there will likely be more mixing opportunities; hence we set the marginal ERC as a larger value. As a specific example, if $y \geq 25$, then we set the marginal ERC as 0.75 of the ETX (e.g., a 25% discount); otherwise, we set the marginal ERC as the ETX (e.g., no discount). However, other marginal ERC computational approaches may alternatively be employed.

3.2 Route Stabilization Via Randomized Route Holding

In a described implementation, potential oscillations are avoided with randomized route holding. In order to model the resource reduction due to local mixing, the ERC takes the traffic load into account. This can potentially cause oscillation in the routing decisions. Notably, the discounts offered by the local mixing engine exist only when the flows cross in certain ways. Stated alternatively, the advertised discounts have restrictions; hence, only a few qualifying flows may find them attractive. Because the discounts benefit all the flows whose packets are being mixed, there is incentive for flows to route in a certain cooperative manner that is ultimately mutually beneficial.

If the flows try such a mutually beneficial arrangement for some time, they will confirm the discounts and tend to stay in the arrangement. Such an arrangement is analogous to the Nash equilibrium in game theory, where no player wants to deviate from its current strategy given all other players' strategies. However, a complication is that there can be more than one equilibrium. We want the flows to make dynamic decisions that eventually settle down to one equilibrium.

To facilitate settling down to one equilibrium, the following strategy may be implemented. To prevent potential route oscillations, we require each flow to stay for at least $T_{hold}$ duration after each route change, where $T_{hold}$ is a random variable. The randomization of the mandatory route holding time $T_{hold}$ is used to avoid flows from changing routes at the same time. For an additional oscillation avoidance measure, after the mandatory route holding duration, each node may be permitted to switch to a new route only if the new route offers an appreciably smaller total cost.

5. Conclusion: Routing with a Markovian Metric to Promote Local Mixing

An example Markovian metric is described herein. The Markovian metric models the cost of a path as the sum of the individual conditional link costs. It is somewhat analogous to the decomposition of the joint probability of a Markov chain into a product of conditional probabilities. The Markovian metric can be used to make routing decisions that better take advantage of local mixing.

An example expected resource consumption (ERC) metric is described as a conditional link metric that models the cost reduction due to local mixing. Markovian metric routing using the ERC link metric can reduce the total resource consumption of a path, leading to better system efficiency. With such a Markovian metric, flows tend to self-organize themselves toward an equilibrium arrangement that can benefit each other. Example techniques that can facilitate flows settling down into an equilibrium are also described.

The local mixing engine, on its own, can improve the link layer efficiency. It identifies mixing opportunities on the fly and takes advantage of them if they are present. Routing with a Markovian metric makes local mixing more useful as it creates more mixing opportunities. This can translate to notable resource saving and throughput gain.

Example Device Implementations

Figure 16:
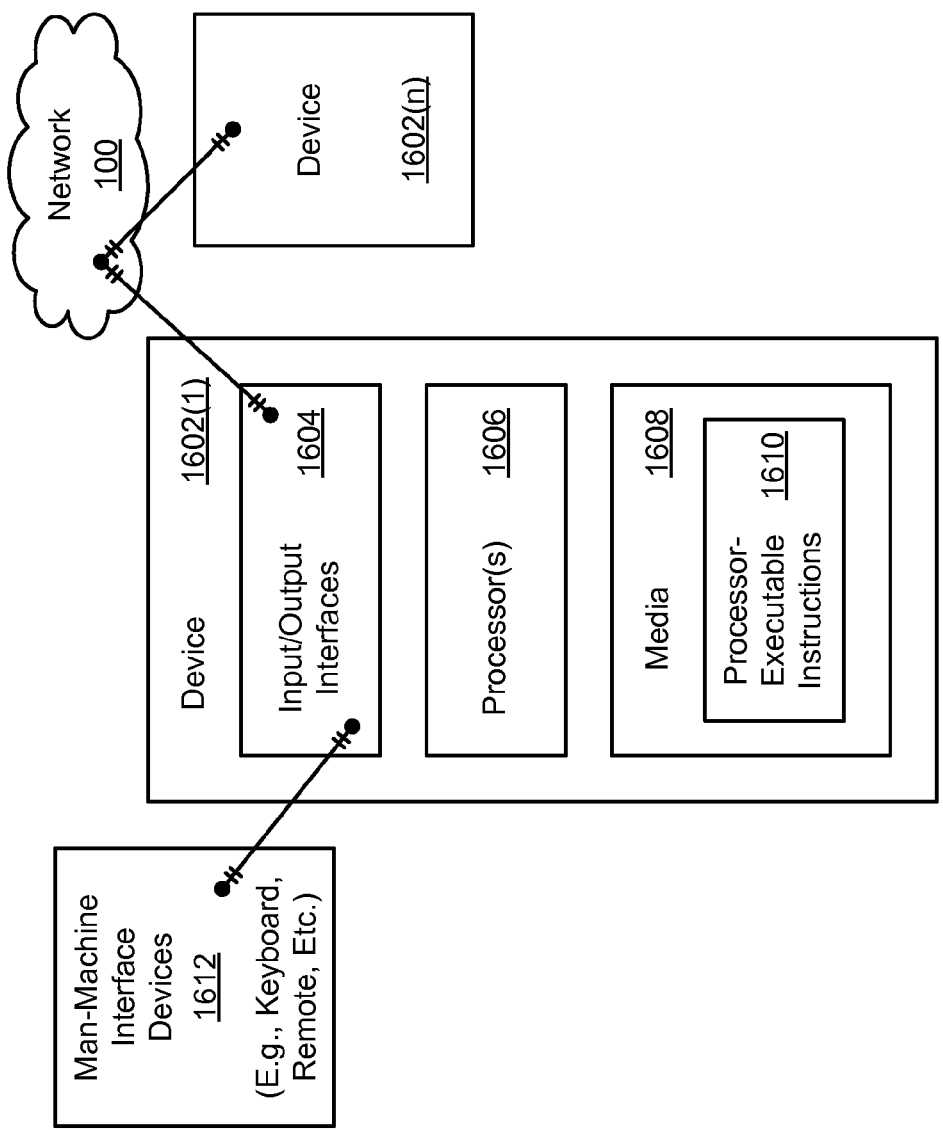
FIG. 16 is a block diagram of an example device that may be used to implement context-based routing in multi-hop networks.

FIG. 16 is a block diagram of an example device 1602 that may be used to implement context-based routing in multi-hop networks. Multiple devices 1602 are capable of forming and communicating over one or more networks 100 (of FIG. 1). Hence, network nodes 102 may be realized as devices 1602. Network 100 may be any network or portion thereof that is formed at least partially of network nodes 102. Thus, network 100 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth.

As illustrated, two devices 1602(1) and 1602(n) are capable of engaging in communications via network 100. Communications include, by way of example but not limitation, the exchange of wireless network parameters (e.g., by broadcast or specifically addressed), interactions to effectuate a path routing, interactions to facilitate local mixing, packet forwarding for a flow, and so forth. Although two devices 1602 are specifically shown, one or more than two devices 1602 may be employed, depending on implementation.

Generally, a device 1602 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1602 includes one or more input/output (I/O) interfaces 1604, at least one processor 1606, and one or more media 1608. Media 1608 include processor-executable instructions 1610.

In a described implementation of device 1602, I/O interfaces 1604 may include (i) a network interface for communicating across network 100, (ii) a display device interface for displaying information on a display screen, (iii) one or more man-machine interfaces, and so forth. Examples of (i) network interfaces include a network card, a modem, one or more ports, a network communications stack, a radio 108, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 1612 (e.g., a keyboard, a remote, a mouse or other graphical pointing device, etc.).

Generally, processor 1606 is capable of executing, performing, and/or otherwise effectuating processor-executable instructions, such as processor-executable instructions 1610. Media 1608 is comprised of one or more processor-accessible media. In other words, media 1608 may include processor-executable instructions 1610 that are executable by processor 1606 to effectuate the performance of functions by device 1602. Processor-executable instructions may be embodied as software, firmware, hardware, fixed logic circuitry, some combination thereof, and so forth.

Thus, realizations for context-based routing in multi-hop networks may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1606 may be implemented using any applicable processing-capable technology. Media 1608 may be any available media that is included as part of and/or accessible by device 1602. It includes volatile and non-volatile media, removable and non-removable media, storage and transmission media (e.g., wireless or wired communication channels), hard-coded logic media, combinations thereof, and so forth. Media 1608 is tangible media when it is embodied as a manufacture and/or composition of matter. For example, media 1608 may include an array of disks or flash memory for longer-term mass storage of processor-executable instructions 1610, random access memory (RAM) for shorter-term storing of instructions that are currently being executed and/or otherwise processed, link(s) on network 100 for transmitting communications, and so forth.

As specifically illustrated, media 1608 comprises at least processor-executable instructions 1610. Generally, processor-executable instructions 1610, when executed by processor 1606, enable device 1602 to perform the various functions described herein. Such functions include, but are not limited to: (i) those actions that are illustrated in flow diagrams 300 and 800 (of FIGS. 3 and 8); (ii) the producing, transmitting, receiving, processing, etc. of link parameters and/or path metrics; (iii) the functions of components 202-208 (of FIG. 2); (iv) the virtual nodes of context-expanded graphs 900A, 900B, and 1000 (of FIGS. 9, 10, and 11); and so forth.

The devices, actions, aspects, features, functions, procedures, modules, data structures, protocols, network nodes, communications, etc. of FIGS. 1-16 are illustrated in diagrams that are divided into multiple blocks and other elements. However, the order, interconnections, interrelationships, layout, etc. in which FIGS. 1-16 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for context-based routing in multi-hop networks.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method for a network node, the method comprising:
   determining one or more conditional link costs depending at least on a local mixing opportunity, wherein the determining includes ascertaining a marginal expected resource consumption (ERC) metric as an estimate of an ERC value if an additional amount of traffic is added to a particular wire $e_{ij} \rightarrow e_{jk}$ of a dot graph representation;
   calculating multiple respective path costs for respective ones of multiple paths responsive to determining the one or more conditional link costs;
   selecting a path from the multiple paths responsive to the path costs calculated; and
   transmitting data from the network node over at least one link of the path selected.

2. The method as recited in claim 1, further comprising creating the dot graph representation of a network in which wires interconnect dots to reflect conditional link costs that are reduced based on a potential local mixing opportunity; and
   applying a shortest path algorithm over the dot graph representation.

3. The method as recited in claim 2, wherein the dot graph representation reflects unconditional link costs.

4. The method as recited in claim 1, wherein the determining further includes:
   ascertaining an expected resource consumption (ERC) metric responsive to a resource total consumed by a number of packets sent within a time period and the number of packets sent within the time period.

5. The method as recited in claim 1, wherein the determining further includes:
   assessing individual resource consumption of an individual packet, which is transmitted as part of a mixture packet, as a fraction of a total resource consumption of the mixture packet.

6. The method as recited in claim 1, wherein calculating utilizes link state routing.

7. The method as recited in claim 6, wherein link state routing comprises:
   measuring one or more respective link costs from the network node to one or more respective neighbor network nodes;
   constructing a packet including the one or more measured link costs; and
   sending the packet to other network nodes.

8. The method as recited in claim 1, wherein calculating utilizes distance vector routing.

9. The method as recited in claim 8, wherein distance vector routing comprises:
   maintaining one or more tables providing a best known cost for a plurality of destination network nodes; and
   exchanging the one or more tables with one or more neighbor network nodes.

10. One or more processor executable instructions that, when executed by the processor, configure a computing device to perform the method of claim 1.

11. A method of introducing context information into cost modeling for a network node, the method comprising:
    determining at least one conditional link cost depending at least on a cost of a first hop plus a cost of a second hop conditioned on the first hop, wherein the determining includes assessing individual resource consumption of an individual packet, which is transmitted as part of a mixture packet, as a fraction of a total resource consumption of the mixture packet;
    calculating a path cost for multiple paths responsive to determining the at least one conditional link cost;
    selecting a path from the multiple paths responsive to the path costs calculated; and
    transmitting data from the network node over at least one link of the path selected.

12. The method as recited in claim 11, wherein the determining further includes:
    ascertaining an expected resource consumption (ERC) metric responsive to a resource total consumed by a number of packets sent within a sliding time window and the number of packets sent within the sliding time window.

13. The method as recited in claim 11, wherein the determining further includes:
    ascertaining a marginal expected resource consumption (ERC) metric as an estimate of an ERC value if an amount of new traffic is added to a wire $e_{ij} \rightarrow e_{jk}$ of a dot graph representation.

14. The method as recited in claim 11, wherein the calculating comprises:
    creating a dot graph representation of a network in which wires interconnect dots to reflect conditional link costs that are reduced based on a potential local mixing opportunity; and
    applying a shortest path algorithm over the dot graph representation.

15. One or more processor executable instructions that, when executed by the processor, configure a computing device to perform the method of claim 11.

16. A network node comprising:

a processor;

one or more computer-readable media storing a plurality of processor-executable modules, the plurality of processor-executable modules comprising;

a context-based routing metric ascertainer configured to ascertain a context-based routing metric based at least on one or more conditional link costs, the one or more conditional link costs based at least on a local mixing opportunity, wherein the context-based routing metric ascertainer is further configured to ascertain a marginal expected resource consumption (ERC) metric as an estimate of an ERC value if an amount of traffic is added to a particular wire of a dot graph representation;

a path value calculator configured to calculate a value for a particular path based on the context-based routing metric and the marginal ERC metric;

a path selector configured to select a path responsive to values calculated by the path value calculator; and a data transmitter configured to transmit data via the selected path.

17. The network node as described in claim 16, wherein the context-based routing metric ascertainer is further configured to ascertain an expected resource consumption (ERC) metric responsive to a resource total consumed by a number of packets sent within a time period and the number of packets sent within the time period.

* * * * *